US006996048B2

(12) United States Patent
Senshu

(10) Patent No.: US 6,996,048 B2
(45) Date of Patent: Feb. 7, 2006

(54) CONCENTRICALLY RECORDING AUXILIARY INFORMATION ON NON-DATA AREA OF A DISK-LIKE RECORDING MEDIUM

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 735 days.

(21) Appl. No.: 09/957,496

(22) Filed: Sep. 20, 2001

(65) Prior Publication Data

US 2002/0060968 A1    May 23, 2002

(30) Foreign Application Priority Data

Sep. 21, 2000   (JP)   ............... 2000-286533

(51) Int. Cl.
    *G11B 7/0045*   (2006.01)
(52) U.S. Cl. ............... 369/59.25; 369/275.3; 369/59.26
(58) Field of Classification Search ......... 369/124.07, 369/124.08, 53.16, 59.25, 275.1, 275.2, 275.3, 369/275.4, 275.5, 53.21, 52.1
    See application file for complete search history.

(56) References Cited

U.S. PATENT DOCUMENTS

| | | | | |
|---|---|---|---|---|
| 5,255,261 A | | 10/1993 | Iida et al. ............... | 369/275.3 |
| 5,380,996 A | * | 1/1995 | Horiguchi ............... | 369/44.28 |
| 5,623,467 A | | 4/1997 | Kato et al. | |
| 5,742,582 A | | 4/1998 | Suzuki ................... | 369/275.1 |
| 6,009,057 A | * | 12/1999 | Furukawa et al. ......... | 369/52.1 |
| 6,034,934 A | | 3/2000 | Miyake et al. | |
| 6,052,465 A | * | 4/2000 | Gotoh et al. ............. | 369/52.1 |
| 6,618,335 B2 | * | 9/2003 | Tanaka et al. ........... | 369/53.21 |
| 6,661,768 B1 | * | 12/2003 | Yumiba et al. .......... | 369/275.4 |
| 2002/0085466 A1 | * | 7/2002 | Shim ...................... | 369/275.3 |

FOREIGN PATENT DOCUMENTS

| | | |
|---|---|---|
| EP | 0 833 319 | 4/1998 |
| EP | 0 971 345 | 1/2000 |
| WO | WO 98 15951 | 4/1998 |

OTHER PUBLICATIONS

Patent Abstracts of Japan, JP 08293162 A (Hitachi Ltd) Nov. 5, 1996.
ECMA: Standardizing Information and Communication Systems: "Standard ECMA-267, 3nd edition: 120 mm DVD—Read Only Disk" Standard ECMA-267, XX, XX, No. 272, Apr. 2001, pp. 1-86, XP002186785.
Thomas M. Cover, Joy A Thomas: "Elements of Information Theory" 1991, John Wiley & Sons, New York, XP002283051.

* cited by examiner

*Primary Examiner*—Brian E. Miller
*Assistant Examiner*—Peter Vincent Agustin
(74) *Attorney, Agent, or Firm*—Oblon, Spivak, McClelland, Maier & Neustadt, P.C.

(57) ABSTRACT

Disclosed is a disk-like recording medium, a disk recording apparatus and a disk recording method, and a disk playback apparatus and a disk playback method. Disk ID is recorded over a circle of a burst cutting area on an optical disk. The circle is divided into n blocks, each of the blocks is divided into m frames, and ID information is recorded in each of the frames with k channel bits.

10 Claims, 19 Drawing Sheets

ABOUT 330°

(PRIOR ART)

FIG. 2

| | ←——————5 bytes——————→ | |
|---|---|---|
| 1 byte | 4 bytes | |
| $SB_{BCA}$ | BCA – Preamble (All 00h) | 1 row |
| $RS_{BCA1}$ | $I_0$    $I_1$    $I_2$    $I_3$ | |
| $RS_{BCA1}$ | $I_4$    $I_5$    $I_6$    $I_7$ | |
| $RS_{BCA1}$ | :    :    :    : | |
| $RS_{BCA1}$ | :    :    :    : | |
| $RS_{BCA2}$ | :    :    :    : | |
| : | | |
| $RS_{BCAi-i}$ | | |
| $RS_{BCAi}$ | | |
| $RS_{BCAi}$ | Information | 4n rows |
| $RS_{BCAi}$ | | ($1 \leq n \leq 12$) |
| $RS_{BCAi}$ | | |
| $RS_{BCAi+i}$ | | |
| : | | |
| $RS_{BCAn-i}$ | | |
| $RS_{BCAn}$ | :    :    :    : | |
| $RS_{BCAn}$ | :    :    :    : | |
| $RS_{BCAn}$ | $I_{16n-8}$   $I_{16n-7}$   $I_{16n-6}$   $I_{16n-5}$ | |
| $RS_{BCAn}$ | $EDC_{BCA}$ (4 bytes) | |
| $RS_{BCA13}$ | $C_{0.0}$   $C_{1.0}$   $C_{2.0}$   $C_{3.0}$ | |
| $RS_{BCA13}$ | :   :   $ECC_{BCA}$   :   : | 4 rows |
| $RS_{BCA13}$ | :   :          :   : | |
| $RS_{BCA13}$ | $C_{0.3}$   $C_{1.3}$   $C_{2.3}$   $C_{3.3}$ | |
| $RS_{BCA14}$ | BCA – Postamble (All 55h) | 1 row |
| $RS_{BCA15}$ | | |

(PRIOR ART)

GF($2^8$)
RS(32,16,13)×3

2

CONCENTRICALLY RECORDING AUXILIARY INFORMATION ON NON-DATA AREA OF A DISK-LIKE RECORDING MEDIUM

BACKGROUND OF THE INVENTION

The present invention relates to a disk-like recording medium, a disk recording apparatus and a disk recording method, and a disk playback apparatus and a disk playback method, and particularly to a disk-like recording medium, a disk recording apparatus and a disk recording method, and a disk playback apparatus and a disk playback method that make it possible to reproduce auxiliary information of a disk reliably.

As write-once or rewritable disks are spread, data replication of which is prohibited (for example contents data such as music data and video data protected by copyright or the like) may be illegally copied. On a DVD (Digital Versatile Disk), for example, a BCA (Burst Cutting Area) is provided to prevent illegal copying between disks.

The BCA provided on a DVD will be described with reference to FIG. 1. A BCA 2 of a DVD 1 (DVD-ROM (Read Only Memory) or DVD-RAM (Random Access Memory)) is irradiated with pulse laser light of a YAG (yttrium-aluminum-garnet) laser at a factory prior to shipment, whereby stripes (bar code) is formed along the innermost circumference by removing, in a radial direction, narrow stripes of reflecting film made of aluminum or the like formed on an inner side of the disk. The stripes show auxiliary information such for example as an ID number and other identification information and an encryption key. The BCA 2 is formed for about 330° along the innermost circumference of the DVD 1.

Data structure of data recorded in the BCA 2 is shown in FIG. 2.

The data recorded in the BCA 2 has a row of five bytes as one unit. A first one byte of the row of five bytes is a sync byte (SB) or a resync (RS) A BCA-Preamble is recorded in four bytes of a first row. The BCA-Preamble is data including only 0s. Four bytes of each row in a BCA data field is an information area or an EDC (error detection code). Four bytes of each row in an ECC (error correction code) area is error correction code. A BCA-Postamble is recorded in a last row.

When the data recorded in the BCA 2 is to be reproduced, a reproducing apparatus generates a clock on the basis of a reproduced signal of the BCA-Preamble part by means of a PLL (Phase Locked Loop), and performs demodulation and error correction by a predetermined method on the basis of the clock to thereby reproduce the data.

However, if the PLL loses synchronism in reproducing the data recorded in the BCA due to some defect, for example, the data cannot be reproduced until the PLL regains synchronism. This means that reproduced data is lost for a period when the synchronism of the PLL is lost.

Also, if a synchronization signal (sync) is lost once due to a defect or the like, data may be lost until a next synchronization signal is detected.

If the amount of lost data is larger than an error correction capability (that is, if there is a local major defect), data cannot be reproduced. The information recorded in the BCA 2 is ID information unique to each disk and the like. It may be related to the entire data on the disk (for example determine whether contents recorded on the DVD 1 may be reproduced or not). Therefore, high reliability is required for data recording and reproduction recorded in the BCA 2. In order to reduce the amount of lost data, a method of frequently inserting a synchronization signal for resynchronization is conceivable; however, such insertion of the redundant synchronization signal reduces the amount of data recordable in the BCA.

SUMMARY OF THE INVENTION

The present invention has been made in view of the above, and it is accordingly an object of the present invention to enable reliable reproduction of data in the BCA.

To achieve the above object, according to a first aspect of the present invention, there is provided a disk-like recording medium including: n blocks arranged in a circle of a second area and each having a length obtained by dividing the second area into n equal parts in a circumferential direction; and m frames arranged in one of the blocks and each having a length obtained by dividing the block into m equal parts in the circumferential direction; wherein auxiliary information is arranged in the frames in such a manner as to be at equal intervals in the circumferential direction, and a synchronization signal is disposed in each of the frames.

In one of the frames, k channel bits may be arranged at intervals obtained by dividing the frame into k equal parts.

The auxiliary information may be modulated by a modulation method capable of word synchronization or bit synchronization.

The modulation method may be a phase encoding method or a 4-1 modulation method.

When a value of the m is two or more, the number of kinds of synchronization signals may be two or more and m or less.

An error correction code can be added to the auxiliary information.

Identical data can be disposed in each of the n blocks.

According to a second aspect of the present invention, there is provided a disk recording apparatus including: rotating means for rotating a disk; generating means for generating a channel clock corresponding to an interval obtained by dividing one frame into k equal parts where n blocks each having a length obtained by dividing a second area into n equal parts in a circumferential direction are generated and m frames each having a length obtained by dividing one of the blocks into m equal parts in the circumferential direction are generated, the channel clock being required for recording auxiliary information; control means for controlling rotation of the disk so that one rotation of the disk is in synchronism with a cycle of n×m×k channel clocks; modulating means for modulating the auxiliary information on the basis of the channel clock generated by the generating means; and recording means for recording the auxiliary information modulated by the modulating means on the disk.

According to a third aspect of the present invention, there is provided a disk recording method including: a rotating step for rotating a disk; a generating step for generating a channel clock corresponding to an interval obtained by dividing one frame into k equal parts where n blocks each having a length obtained by dividing a second area into n equal parts in a circumferential direction are generated and m frames each having a length obtained by dividing one of the blocks into m equal parts in the circumferential direction are generated, the channel clock being required for recording auxiliary information; a control step for controlling rotation of the disk so that one rotation of the disk is in synchronism with a cycle of n×m×k channel clocks; a modulating step for modulating the auxiliary information on the basis of the channel clock generated by processing of the generating step; and a recording step for recording the auxiliary information modulated by processing of the modulating step on the disk.

According to a fourth aspect of the present invention, there is provided a disk playback apparatus including: rotating means for rotating a disk at a constant angular velocity; playback means for playing back the disk; generating means for generating a clock having a frequency twice n×m×k or higher; and demodulating means for sampling a signal outputted by the playback means on the basis of the clock generated by the generating means and demodulating channel bits, or words while correcting the channel bits, or the words.

The disk playback apparatus can further include correcting means for making error correction on the basis of an error correction code included in the auxiliary information and determining correct auxiliary information by majority rule.

The correcting means can make error correction on auxiliary information obtained by collecting portions determined by majority rule.

According to a fifth aspect of the present invention, there is provided a disk playback method including: a rotating step for rotating a disk at a constant angular velocity; a playback step for playing back the disk; a generating step for generating a clock having a frequency twice n×m×k or higher; and a demodulating step for sampling a signal outputted by processing of the playback step on the basis of the clock generated by processing of the generating step and demodulating channel bits, or words while correcting the channel bits, or the words.

The disk-like recording medium according to the present invention includes: n blocks arranged by dividing a circle of a second area into n equal parts; and m frames arranged in each of the blocks; wherein auxiliary information is arranged in the frames in such a manner as to be at equal intervals in a circumferential direction, and a synchronization signal is disposed in each of the frames.

The disk recording apparatus and disk recording method according to the present invention control rotation of a disk so that one rotation of the disk is in synchronism with a cycle of n×m×k channel clocks, modulate auxiliary information on the basis of the channel clocks, and then record the auxiliary information on the disk.

The disk playback apparatus and the disk playback method according to the present invention sample a reproduced output signal from a disk by a clock having a frequency twice n×m×k or higher, and demodulate channel bits, or words while correcting the channel bits, or the words.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2 shows a recording format of the burst cutting area in FIG. 1;

DETAILED DESCRIPTION OF PREFERRED EMBODIMENTS

Preferred embodiments of the present invention will hereinafter be described with reference to the drawings.

Figure 1:
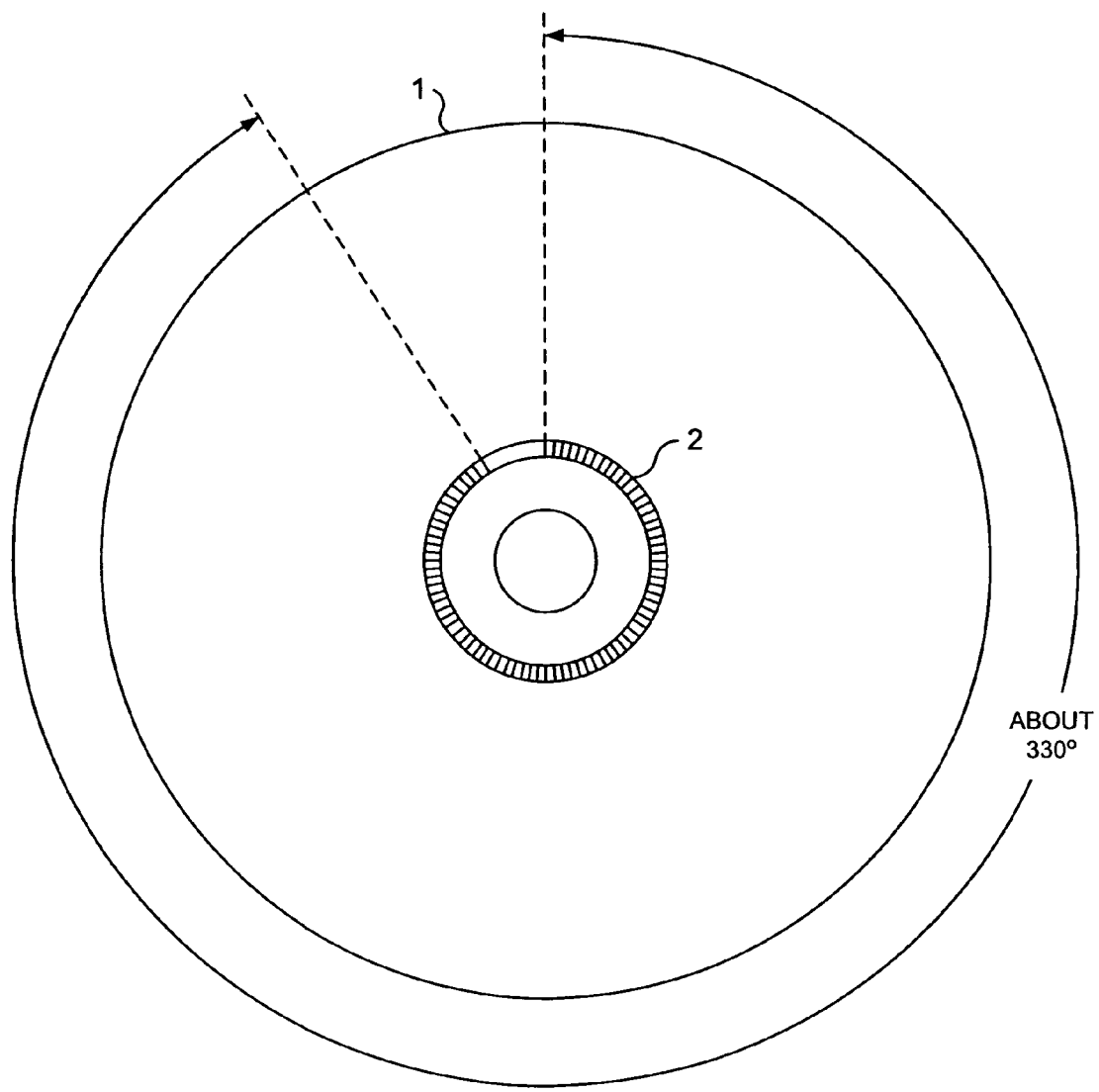
FIG. 1 is a diagram of assistance in explaining a burst cutting area on a related-art DVD.
Figure 3:
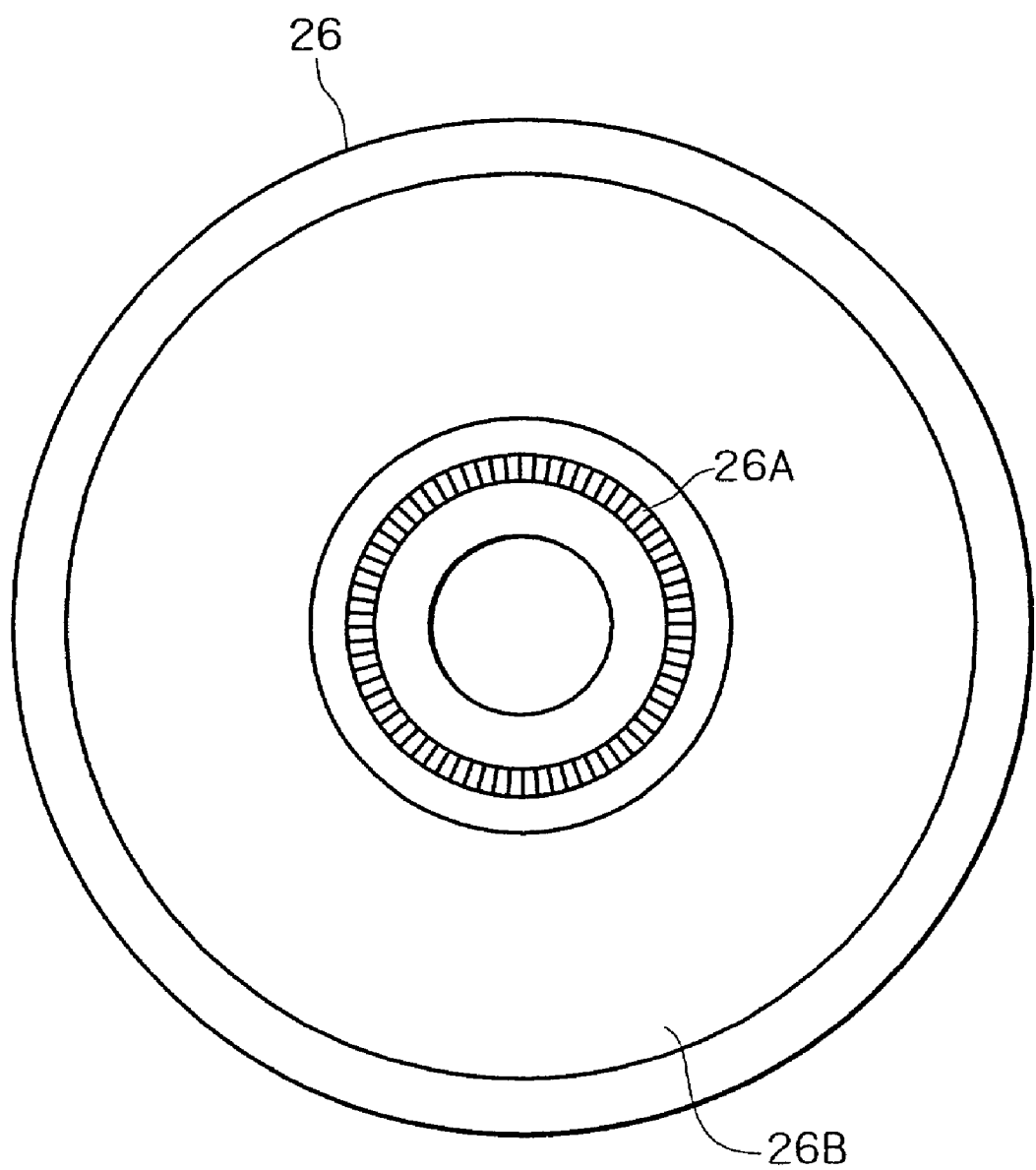
FIG. 3 shows structure of an optical disk to which the present invention is applied.

In the present invention, as shown in FIG. 3, ID information unique to an optical disk 26 is recorded in a burst cutting area (BCA) 26A on the outside (in this case, on the innermost side) of a data area 26B within an inner radius of the optical disk 26 in which area contents data is recorded. As shown in FIG. 3, the burst cutting area 26A is created in such a manner as to form a continuous circle.

Figure 4:
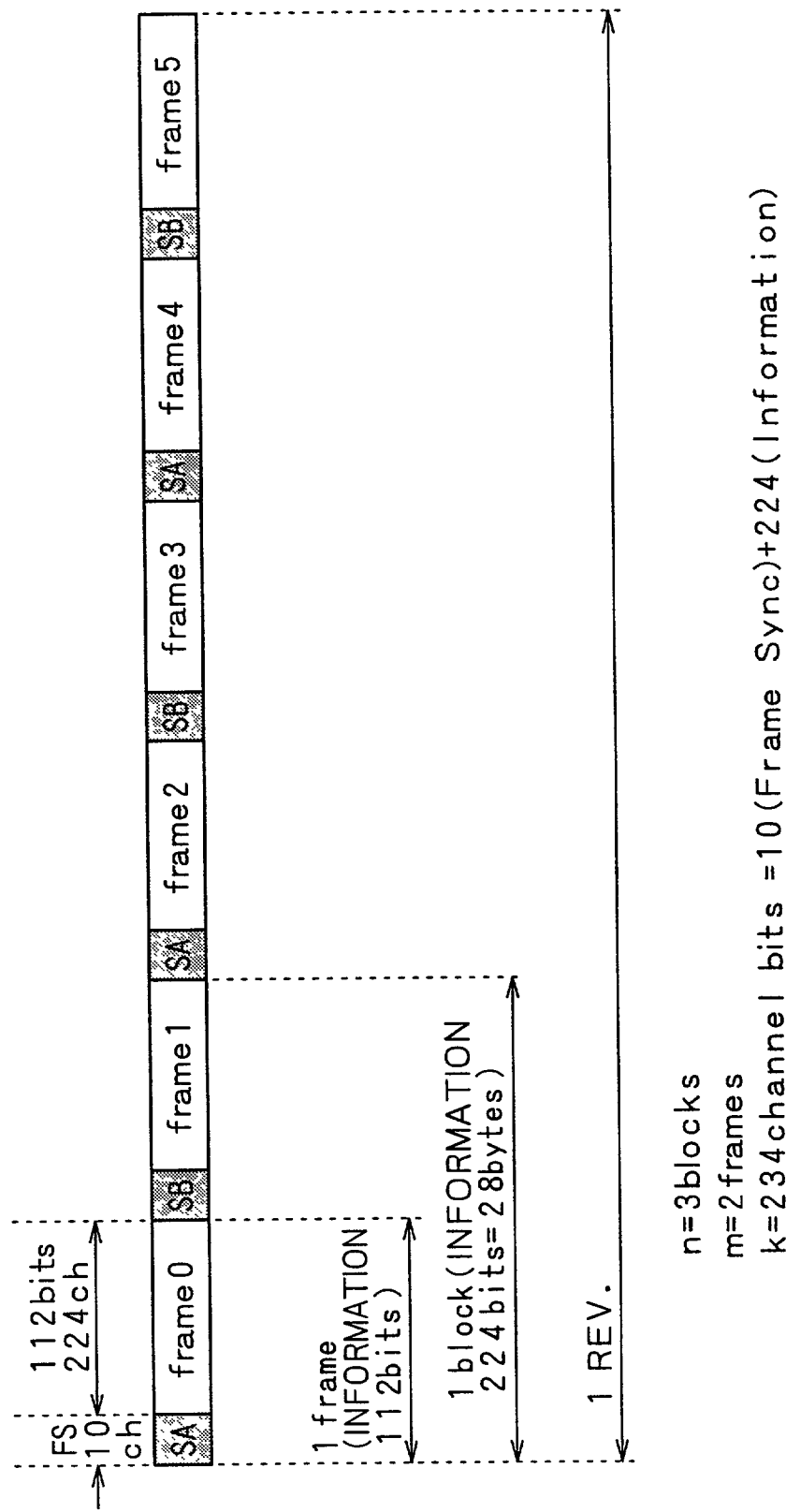
FIG. 4 shows a recording format of the burst cutting area in FIG. 3.

FIG. 4 shows an example of a disk ID recording format recorded in the BCA 26A. (Original) As shown in FIG. 4, the circle is divided into n equal parts (in this case, n=3), thereby forming n blocks.

Each of the blocks is further divided into m frames (in the example of FIG. 4, m=2). Each of the frames is divided into k parts (in this case, k=234). The ID information is recorded with k channel bits.

Ten channel bits at the front of each of the frames is frame sync. The succeeding 224 channel bits forms a data area.

Here, it is assumed that disk ID information is modulated by a PE (Phase Encode) modulation method, for example. The PE modulation converts one-bit data into two channel bits, and therefore 112 data bits (224 channel bits) can be recorded in a single frame, while 224 information bits (28 bytes) can be recorded in a single block.

Figure 5:
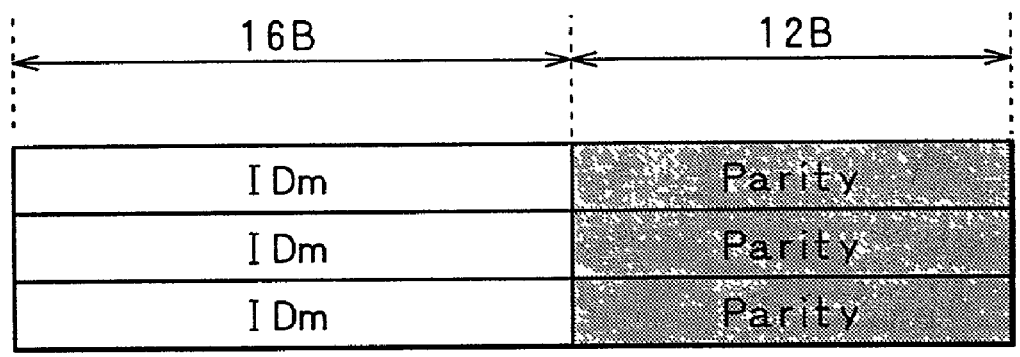
FIG. 5 is a diagram of assistance in explaining an ECC format in the burst cutting area in FIG. 3.

In this example, disk ID information in an ECC format as shown in FIG. 5 is recorded in each of the blocks. In this example, 12-byte parity is added to 16-byte data, and the disk ID information is encoded by a Reed-Solomon code RS (32, 16, 13) of a Galois field GF ($2^8$). Three blocks each have the same ECC format. Thus, 14 bytes of 16-byte ID information $ID_m$ is disposed as information bits of 14 bytes in a first frame of each of the blocks. The remaining two bytes of the ID information $ID_m$ and 12-byte parity are disposed as information bits of 14 bytes in the next frame.

This means triple writing of the same disk ID information in the circle of the disk. This triple writing is in effect equivalent to forming a product code of distance 3 in a vertical direction.

Figure 6:
FIG. 6 is a diagram of assistance in explaining PE modulation.

As shown in FIG. 6, the PE modulation is a code indicating a data bit by the position of a mark (1) (bit indicated in black in FIG. 6) and a space (0) (bit indicated in white in FIG. 6). In the example of FIG. 6, a data bit of "0" is converted into channel bits (word) of "10" and a data bit of "1" is converted into channel bits (word) of "01". In the PE modulation, the channel bits are inverted at a center of two channel bits (center of a word) indicating a data bit. Thus, in the case of data bits, marks or spaces do not occur continuously for three channel bits or more.

Figure 7A:
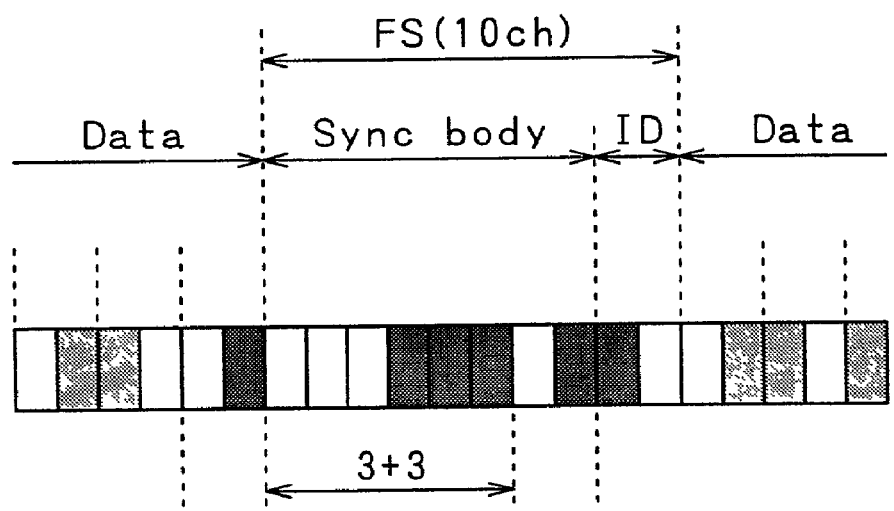
FIGS. 7A and 7B are diagrams of assistance in explaining sync patterns of frame sync in FIG. 4.
Figure 7B:
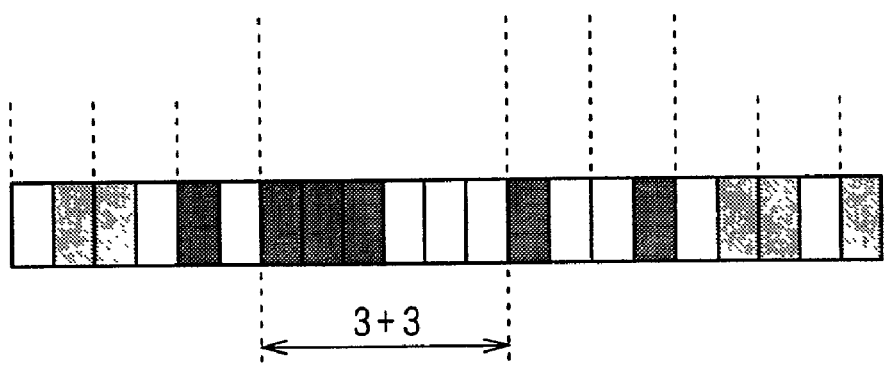

Accordingly, a sync pattern indicating sync bits (frame sync) can be formed by arranging marks or spaces continuously in three channel bits or more. FIGS. 7A and 7B each show a sync pattern of frame sync.

As shown in FIGS. 7A and 7B, two kinds of sync patterns of six channel bits are provided as frame sync patterns in which marks and spaces each occur continuously in three channel bits. When channel bits of data immediately preceding a frame sync are "01", "000111" is used as the frame sync, and "01" is added as a succeeding sync pattern. On the other hand, when channel bits of data immediately preceding a frame sync are "10", "111000" is used as the frame sync, and "10" is added as a succeeding sync pattern. Channel bits of "01" or "10" are further added as sync ID after the above sync body ("00011101" or "11100010"). Thus, a total of 10 channel bits form a frame sync. Hereinafter, a frame sync when a sync ID pattern is "0" (channel bits="10") (FIG. 7A) will be referred to as SA, and a frame sync when a sync ID pattern is "1" (channel bits="01") (FIG. 7B) will be referred to as SB.

A frame sync SA is used to indicate that its frame is a first frame of a block, whereas a frame sync SB is used to indicate that its frame is other than a first frame of each of the blocks. Hence, the number of frames having frame syncs SA is equal to the number of blocks.

Figure 8:
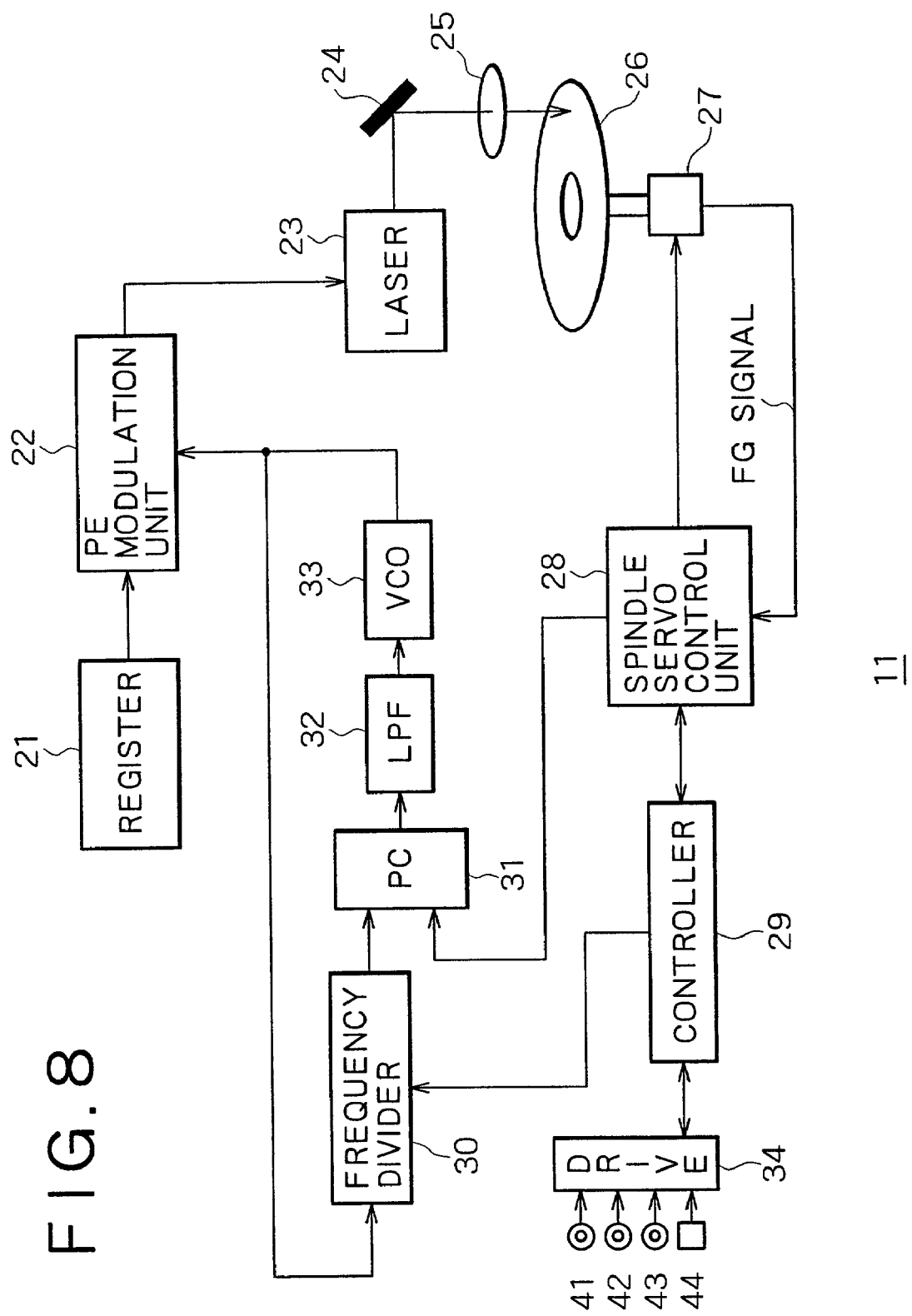
FIG. 8 is a block diagram showing a configuration of a disk ID recording apparatus for recording disk ID information on the optical disk of FIG. 3.

FIG. 8 is a block diagram showing a configuration of a disk ID recording apparatus 11 to which the present invention is applied.

A register 21 stores the disk ID information that has been subjected to error correction coding in accordance with the ECC format shown in FIG. 5. A PE modulation unit 22 reads the disk ID information stored in the register 21, subjects the disk ID information to PE modulation, and then outputs the result to a laser 23. The PE modulation unit 22 subjects the disk ID information read from the register 21 to the PE modulation according to a clock (channel clock) inputted from a VCO (voltage controlled oscillator) 33 and then inserts sync patterns to thereby generate data to be recorded in the BCA 26A of the optical disk 26. The PE modulation unit 22 outputs the data to the laser 23.

The laser 23 is a YAG laser, for example, and irradiates the optical disk 26 with a high-power laser beam via a mirror 24 and an object lens 25. The object lens 25 includes a cylindrical lens, for example, and irradiates the BCA 26A of the optical disk 26 with the laser beam entering the object lens 25. Thus, a reflecting film of the optical disk 26 is changed irreversibly, whereby the disk ID information is recorded as a bar code. That is, even if the optical disk is a rewritable recording medium, the auxiliary data such as disk ID recorded in the BCA 26A is recorded on the optical disk 26 as unrewritable data.

A spindle motor 27 rotates the optical disk 26 under control of a spindle servo control unit 28, and an FG (Frequency Generator) signal generator not shown in the figure provided within the spindle motor 27 generates an FG signal that forms one pulse each time the optical disk 26 (spindle motor 27) rotates by a predetermined angle, and then outputs the FG signal to the spindle servo control unit 28. Under control of a controller 29, the spindle servo control unit 28 controls the spindle motor 27 on the basis of the FG signal inputted from the spindle motor 27 so that the spindle motor 27 rotates at a predetermined rotational speed. Also, the spindle servo control unit 28 outputs the FG signal inputted from the spindle motor 27 to the controller 29 and a PC (Phase Comparator) 31.

The controller 29 controls the spindle servo control unit 28 according to an operating signal inputted from an operating unit not shown in the figure to thereby drive the spindle motor 27 and thus rotate the optical disk 26. In addition, the controller 29 generates a control signal for controlling a frequency dividing ratio of a frequency divider 30 on the basis of the FG signal inputted from the spindle servo control unit 28, and then outputs the control signal to the frequency divider 30.

The frequency divider 30, the PC 31, an LPF (Low Pass Filter) 32, and the VCO 33 form a PLL.

The frequency divider 30 divides the clock outputted by the VCO 33 into a value 1/N (frequency dividing ratio) set on the basis of the control signal inputted from the controller 29, and then outputs the result to the PC 31. The PC 31 compares the phase of a clock inputted from the frequency divider 30 with the phase of the FG signal inputted from the spindle servo control unit 28 to thereby generate a phase difference signal, and then outputs the phase difference signal to the LPF 32. The LPF 32 removes a high-frequency component from the signal inputted thereto, and then outputs the result to the VCO 33. The VCO 33 changes the phase (frequency) of the clock that the VCO 33 outputs by oscillation on the basis of a voltage applied to a control terminal of the VCO 33 (that is, the output from the LPF 32).

The clock outputted by the VCO 33 is inputted to the PE modulation unit 22 and also to the frequency divider 30. The VCO 33 is controlled so that a phase difference between the output of the frequency divider 30 and the FG signal outputted by the spindle servo control unit 28 becomes constant. Therefore, the output of the VCO 33 is a signal oscillating in sync with the FG signal at a frequency N times that of the FG signal. The PE modulation unit 22 outputs the data in the format described with reference to FIG. 4 according to the clock inputted from the VCO 33 to the laser 23.

A drive 34 is connected to the controller 29. A magnetic disk 41, an optical disk 42, a magneto-optical disk 43, or a semiconductor memory 44 is inserted into the drive 34 as required. A necessary computer program, for example, is read from the magnetic disk 41, the optical disk 42, the magneto-optical disk 43, or the semiconductor memory 44, and is supplied to the controller 29.

Operation of the disk ID recording apparatus 11 will next be described. When a command to start recording is issued, the controller 29 controls the spindle servo control unit 28 to rotate the spindle motor 27 at a predetermined speed. The spindle motor 27 generates an FG signal corresponding to its rotation, and then supplies the FG signal to the spindle servo control unit 28. The spindle servo control unit 28 supplies the FG signal to the PC 31.

The PC 31 compares the phases of two input signals with each other, and then supplies a signal of a phase error between the two signals to the VCO 33 via the LPF 32. The VCO 33 generates a clock having a phase and a frequency corresponding to a signal (control voltage) supplied from the LPF 32.

The clock outputted by the VCO 33 is supplied to the frequency divider 30 to be divided by a predetermined frequency dividing ratio set via the controller 29, and then supplied to the PC 31.

Thus, the clock (channel clock) outputted by the VCO 33 has a cycle of $1/(n \times m \times k)$ of one rotation of the optical disk 26 (spindle motor 27). For example, when an FG wave number per rotation of the FG signal is 36 and the value of the frequency dividing ratio 1/N of the frequency divider 30 is 1/39, the VCO 33 generates a channel clock having a cycle of $1/(3 \times 2 \times 234)$ of the time period of one rotation of the spindle motor 27 (optical disk 26).

The PE modulation unit 22 subjects disk ID information supplied from the register 21 to PE modulation based on the channel clock supplied from the VCO 33 and then outputs the disk ID information to the laser 23. The laser 23 generates a laser beam on the basis of the data supplied from the PE modulation unit 22 to thereby irradiate the optical disk 26 with the laser beam via the mirror 24 and the object lens 25. Thus, the disk ID information is recorded concentrically over a plurality of tracks in the BCA 26A of the optical disk 26 at a factory prior to shipment.

Incidentally, depending on output intensity required by the laser 23, the cycle of the channel clock outputted by the VCO 33 may be multiplied by r to be $r/(n \times m \times k)$. In this case, a frequency dividing coefficient N of the frequency divider 30 is also multiplied by r.

Figure 9:
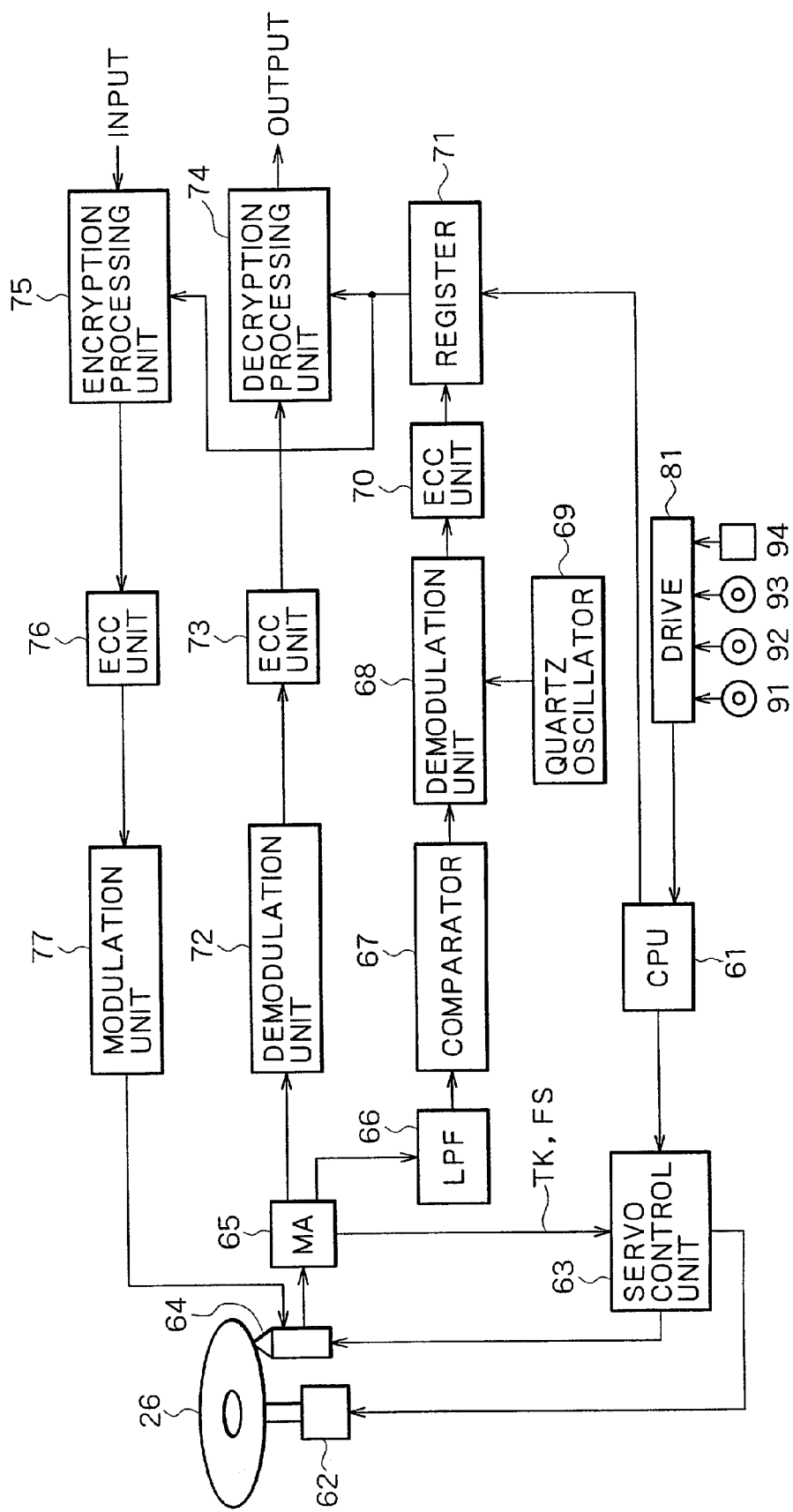
FIG. 9 is a block diagram showing a configuration of a disk recording and playback apparatus for recording or reproducing data on the optical disk having disk ID recorded by the disk ID recording apparatus of FIG. 8.

FIG. 9 is a block diagram showing a configuration of a disk recording and playback apparatus 51 for recording data and reproducing data recorded in the data area 26B of the optical disk 26 having the disk ID information recorded in a manner as described above in its BCA 26A.

A CPU 61 controls parts of the disk recording and playback apparatus 51 according to an operating signal inputted from an operating unit not shown in the figure to thereby record data and reproduce data recorded in the data area 26B of the optical disk 26. In reproducing data or recording data, the CPU 61 outputs the disk ID information of the optical disk 26 retained by a register 71 to a decryption processing unit 74 or an encryption processing unit 75. Also, the CPU 61 generates a control signal to rotate or stop the optical disk 26, and outputs the control signal to a servo control unit 63.

The servo control unit 63 makes an optical pickup 64 seek to a specified position on the optical disk 26 on the basis of the control signal inputted from the CPU 61, and also effects tracking control and focus control of the optical pickup 64 on the basis of a tracking error signal (TK) and a focus error signal (FS) supplied from a matrix amplifier (MA) 65. A spindle motor 62 rotates the optical disk 26 at a predetermined rotational speed under control of the servo control unit 63.

In reproducing the disk ID information, the optical disk 26 is rotated by a CAV (Constant Angular Velocity) method.

The optical pickup 64 is held by a specified sled mechanism so as to be able to move in a radial direction of the optical disk 26. When data recorded on the optical disk 26 is to be read, the optical pickup 64 irradiates the optical disk 26 with a laser beam according to a control signal inputted from the servo control unit 63, receives the reflected beam, converts the reflected beam into an electric signal, and then outputs the electric signal to the matrix amplifier 65. When the optical pickup 64 records new data on the optical disk 26, the optical pickup 64 irradiates the optical disk 26 with a laser beam on the basis of data outputted from a modulation unit 77 to thereby record the new data in the data area 26B of the optical disk 26.

The matrix amplifier 65 processes the signal inputted from the optical pickup 64, and then outputs a reproduced signal of data corresponding to the disk ID information recorded in the BCA 26A of the optical disk 26 to an LPF 66. Also, the matrix amplifier 65 generates a tracking error signal whose signal level changes according to an amount of tracking error and a tracking error signal whose signal level changes according to an amount of focus error, and then outputs the signals to the servo control unit 63. In addition, the matrix amplifier 65 outputs a reproduced signal of data recorded in the data area 26B of the optical disk 26 to a demodulation unit 72.

The LPF 66 removes a high-frequency component of the signal inputted thereto to thereby suppress variation in the reproduced signal caused by noise, and then outputs the result to a comparator 67. The comparator 67 binarizes the signal inputted thereto by comparing the signal with a predetermined level. A demodulation unit 68 samples the signal inputted thereto on the basis of a sampling clock inputted from a quartz oscillator 69, makes channel position correction, performs demodulation (in this case, PE demodulation), and then outputs the result to an ECC (Error Check and Correct) unit 70. A sampling clock number per rotation of the disk is set to be $n \times m \times k \times p$ (n, m, and k are numerical values based on the disk ID recording format described with reference to FIG. 4, and p is an integer of two or more) The ECC unit 70 supplies the demodulated data (disk ID information) inputted thereto to the register 71 for storage.

In the meantime, the demodulation unit 72 demodulates data (contents data) supplied from the matrix amplifier 65, and then supplies the demodulated data to an ECC unit 73. The ECC unit 73 subjects the demodulated data inputted thereto to error correction processing, and then supplies the result to the decryption processing unit 74. The decryption processing unit 74 decrypts the contents data supplied from the ECC unit 73 on the basis of the disk ID information supplied from the register 71, and then outputs the result to an apparatus not shown in the figure.

The encryption processing unit 75 encrypts contents data inputted thereto on the basis of the disk ID information supplied from the register 71, and then outputs the result to an ECC unit 76. The ECC unit 76 adds an error correction code to the encrypted contents data inputted thereto, and then outputs the result to the modulation unit 77.

A magnetic disk 91, an optical disk 92, a magneto-optical disk 93, or a semiconductor memory 94 is inserted into a drive 81 as required. The drive 81 supplies a program read from the magnetic disk 91, the optical disk 92, the magneto-optical disk 93, or the semiconductor memory 94 to the CPU 61.

Operation of the disk recording and playback apparatus 51 will next be described. When the optical disk 26 is inserted into the disk recording and playback apparatus 51, the CPU 61 controls the servo control unit 63 to rotate the spindle motor 62 at a constant angular velocity (by the CAV method). This velocity is the same as the velocity at which the spindle motor 27 of the disk ID recording apparatus 11 of FIG. 8 rotates the optical disk 26.

At this point in time, the servo control unit 63 moves the optical pickup 64 in a radial direction of the optical disk 26 to play back the BCA 26A of the optical disk 26.

Reproduced data outputted from the optical pickup 64 is inputted from the matrix amplifier 65 to the comparator 67 via the LPF 66 to be binarized. The demodulation unit 68 samples the binarized data inputted from the comparator 67 on the basis of a sampling clock supplied from the quartz oscillator 69, and thereby demodulates the data. Also, the demodulation unit 68 performs processing for correcting channel bits and words. The processing will be described later in detail.

The demodulated data outputted from the demodulation unit 68 is supplied to the ECC unit 70 to be subjected to error correction processing based on an error correction code. The result is supplied to the register 71 to be stored therein. Thus, the disk ID information recorded in the BCA 26A of the optical disk 26 is stored in the register 71.

When a command to record contents data is issued, the CPU 61 controls the servo control unit 63 to rotate the optical disk 26 by a CLV method via the spindle motor 62.

The encryption processing unit 75 encrypts contents data inputted from an apparatus not shown in the figure on the basis of the disk ID information stored in the register 71, and then outputs the contents data to the ECC unit 76. The ECC unit 76 adds an error correction code to the contents data inputted from the encryption processing unit 75, and then outputs the resulting contents data to the modulation unit 77. The modulation unit 77 modulates the contents data inputted from the ECC unit 76 by the PE method or another predetermined modulation method, and then outputs the resulting contents data to the optical pickup 64. The optical pickup 64 records the contents data inputted from the modulation unit 77 in the data area 26B of the optical disk 26.

When a command to reproduce the contents data thus recorded is issued, the CPU 61 controls the servo control unit 63 to rotate the optical disk 26 by the CLV method as in the case as described above. The optical pickup 64 plays back the data area 26B of the optical disk 26, and then outputs the reproduced data to the matrix amplifier 65. The matrix amplifier 65 supplies the reproduced data to the demodulation unit 72. The demodulation unit 72 demodulates the reproduced contents data inputted thereto by a demodulation method corresponding to the modulation method of the modulation unit 77, and then outputs the resulting data to the ECC unit 73. The ECC unit 73 subjects the demodulated data inputted from the demodulation unit 72 to error correction processing, and then supplies the resulting data to the decryption processing unit 74. The decryption processing unit 74 decrypts the contents data (encrypted contents data) inputted from the ECC unit 73 on the basis of the disk ID information inputted from the register 71, and then outputs the result to an apparatus not shown in the figure.

As described above, encrypted contents data is recorded in the data area 26B of the optical disk 26. Therefore, even if the encrypted contents data is copied onto other disks as it is by a computer or the like, it is not possible to copy the disk ID information, thereby preventing decryption of the contents data. Thus, it is possible to practically control illegal copying of contents data in large quantities.

The channel position correction made by the demodulation unit 68 will next be described with reference to FIGS. 10A through 10E. In this case, description will be made assuming that p=3.

Figure 10:
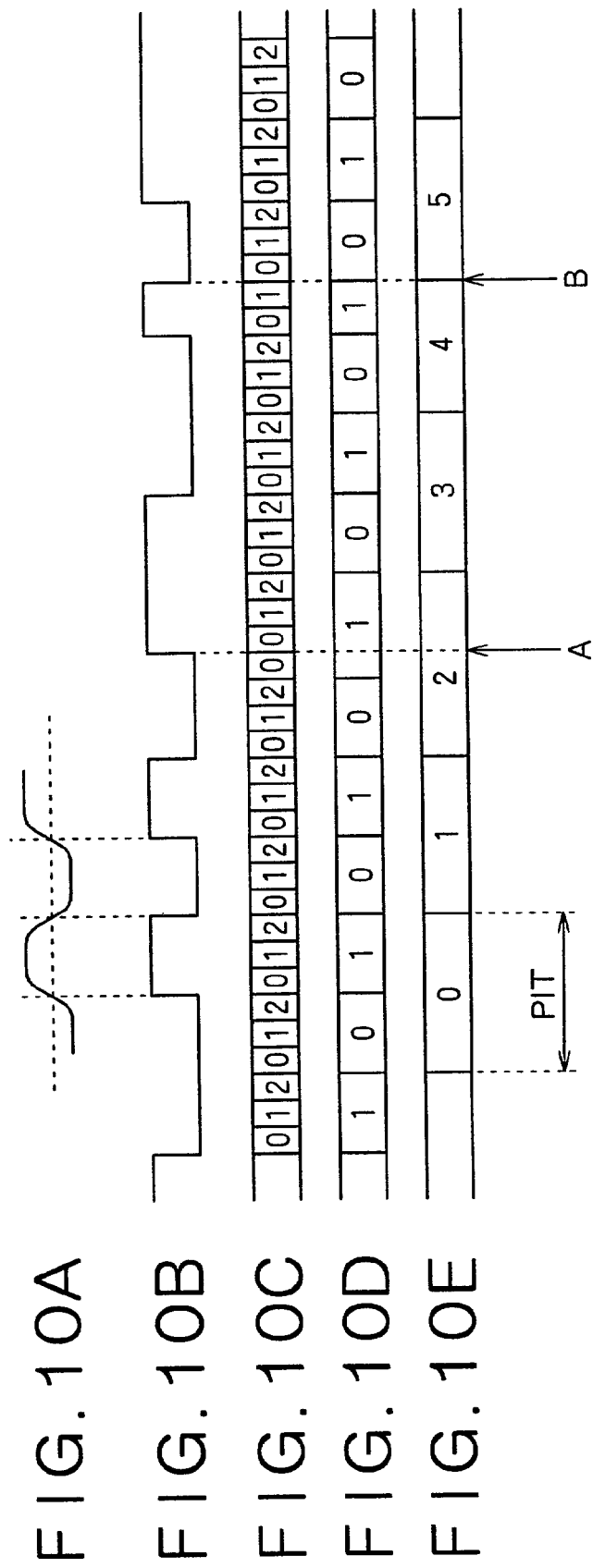
FIGS. 10A through 10E are diagrams of assistance in explaining operation of a demodulation unit in FIG. 9.

A reproduced pit waveform (FIG. 10A) outputted from the LPF 66 is binarized by the comparator 67, and then inputted to the demodulation unit 68 as a binarized pit signal (FIG. 10B). The demodulation unit 68 includes counters 1 to 3 (not shown). The counter 1 (FIG. 10C) counts the number of clocks (0 to p-1) within a channel bit. The counter 2 (FIG. 10D) counts the number of two channel bits of the PE modulation. The counter 3 (FIG. 10E) counts the number of bits (words) of the PE modulation.

The channel position correction is made by utilizing the fact that in the PE modulation, bits are invariably inverted at a center of a pit (that is, center of a word "10" or "01" shown in FIG. 6). Specifically, in timing A in FIGS. 10B through 10E, even though the value of the counter 3 is not changed (even though at a center of a pit), level of the binarized pit signal is inverted, and therefore the value of the counter 1 immediately after the timing A is corrected to be "0". Also, the channel position correction is made by utilizing the fact that when the same data bits occur continuously, channel bits are inverted at a point between the data bits (between the words). Specifically, in timing B in FIGS. 10B through 10E, when the value of the counter 3 is changed (at a point between words), the level of the binarized pit signal is inverted, and thus the values of the counters 1 and 2 are corrected to be "0".

A plurality of frame syncs are arranged at equal intervals for one rotation of the optical disk 26. Therefore, frame syncs are endlessly generated in a constant cycle as the optical disk 26 is rotated. Hence, even when a frame sync of a frame is not detected, it is possible to reproduce data succeeding the frame sync without loss of the data on the basis of interpolating timing of a frame sync previously detected.

Figure 11:
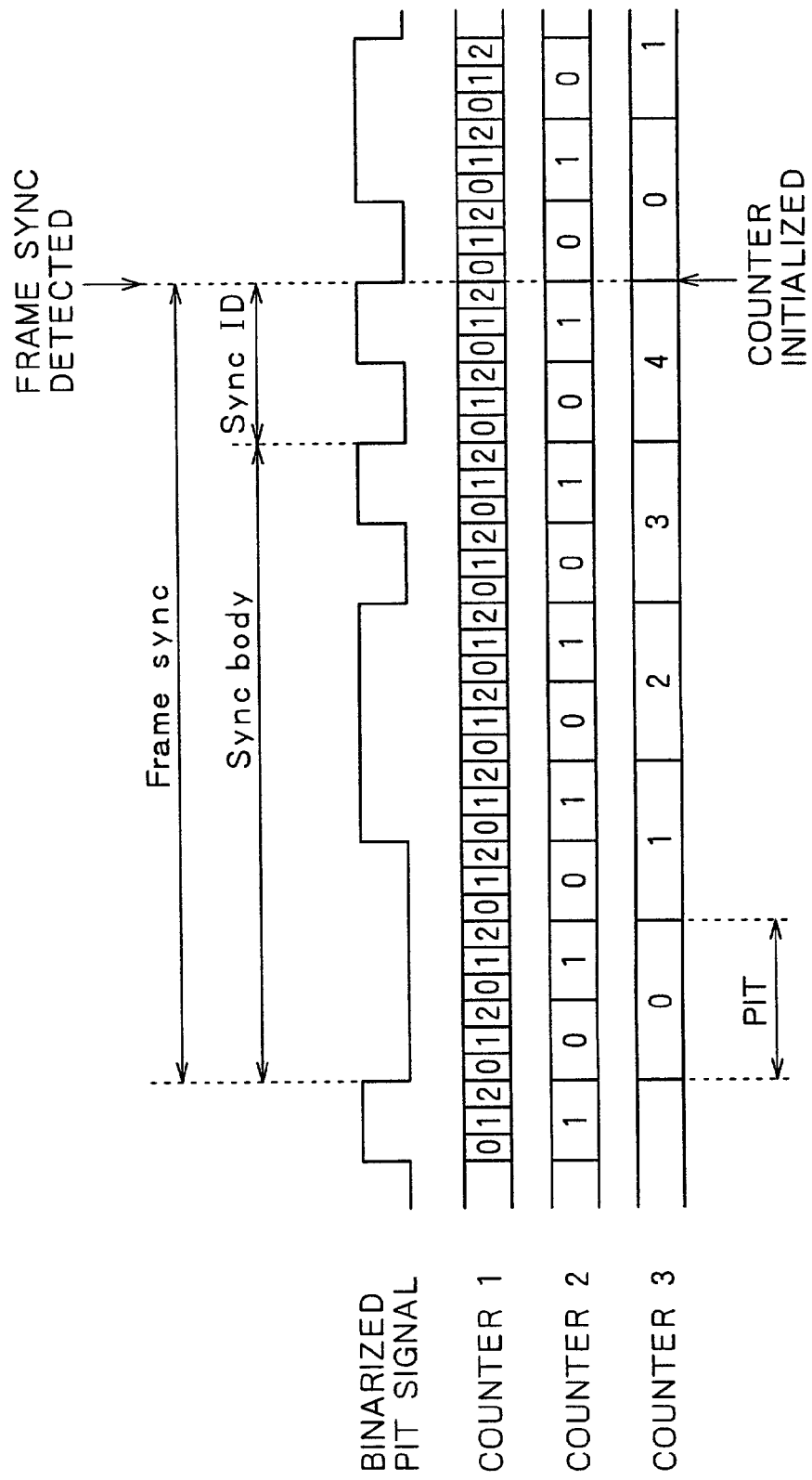
FIG. 11 is a diagram of assistance in explaining operation of the demodulation unit in FIG. 9.

As shown in FIG. 11, when a frame sync ("00011101XX" or "11100010XX") (FIGS. 7A and 7B) is detected, the values of the counters 1 to 3 are all initialized to "0".

The ECC unit 70 is supplied with the demodulated data (that is, the disk ID information including parity written triply as described with reference to FIG. 4), and then subjects the data to error correction processing. Each piece of the triply written disk ID information is subjected to error correction. When a result of error correction of a third block is different from results of error correction of the other two blocks (a first and a second block), for example, the results of error correction of the first block and the second block are used as the disk ID information under a majority rule. The ECC unit 70 outputs the error-corrected disk ID information to the register 71 for storage.

The ECC unit 70 can also determine correct words in each of the blocks by majority and then perform error correction processing on a code generated by collecting correct words.

For example, when a first word in the first block coincides with a first word in the second block and a first word in the third block is different from the first words in the first block and the second block, the first word in the first block (or the second block) is used as a correct word. When a second word in the second block coincides with a second word in the third block and a second word in the first block is different from the second words in the second block and the third block, the second word in the second block (or the third block) is used as a correct word. Other correct words are collected in a similar manner on the basis of the majority rule to reconstruct a single piece of disk ID information. Then the disk ID information is subjected to error correction processing.

It is assumed that disk ID is reproduced without using a tracking servo, as described above. Therefore, when the reproducing operation is repeatedly performed over a plurality of rotations of the optical disk 26, a different reproduction result (reproduced data) may be obtained because of a slightly shifted radial tracking position or the like. Accordingly, the reproducing operation or correcting operation can be performed over a plurality of rotations of the optical disk 26.

As a second embodiment, modulation of disk ID information using a 4-1 modulation for recording will next be described.

Figure 12:
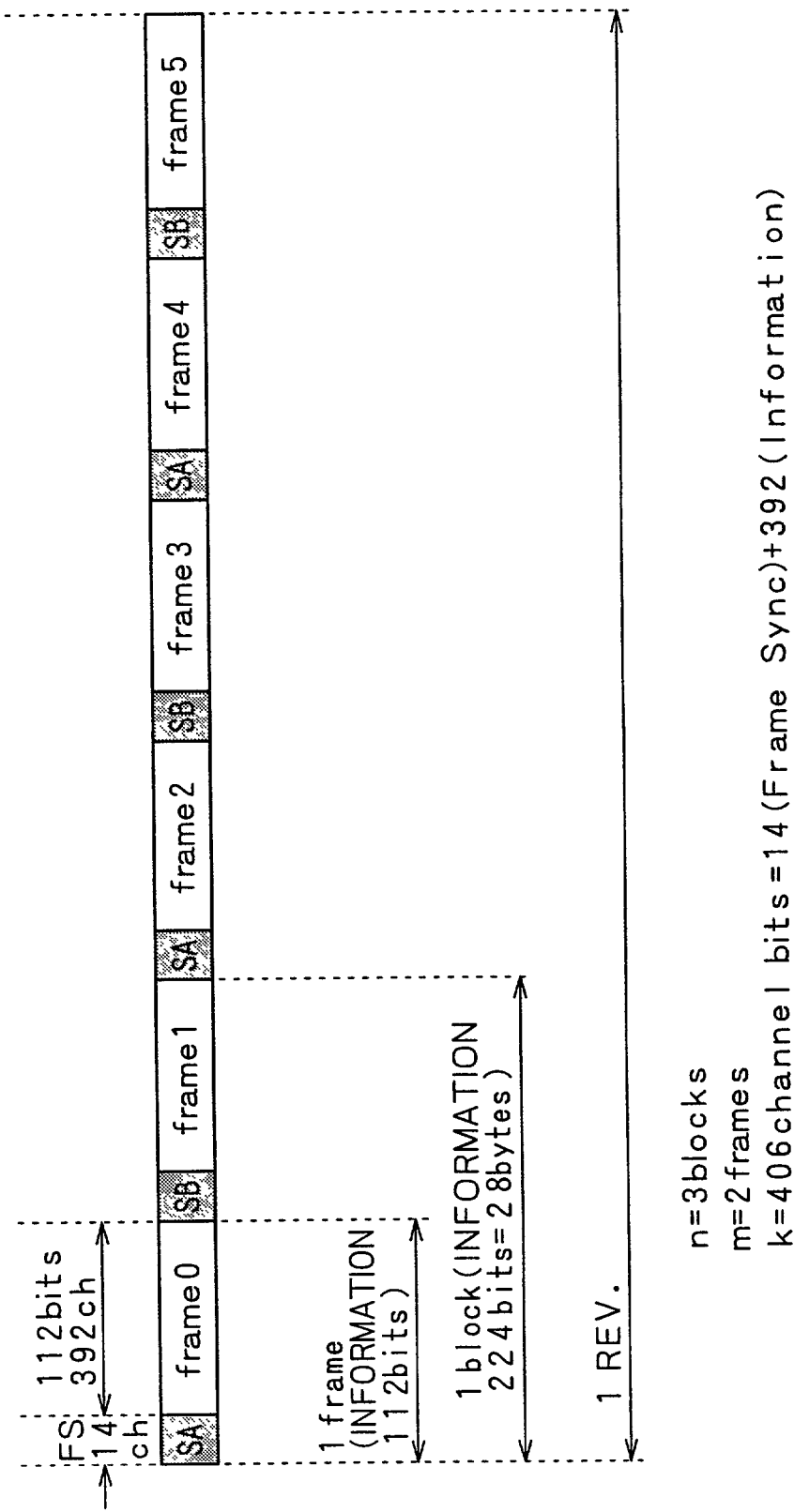
FIG. 12 shows another format in the burst cutting area of the optical disk of FIG. 3.

FIG. 12 shows a disk ID recording format in this case.

Also in this case, as in the first embodiment, the circle of the BCA 26A of the optical disk 26 is divided into three equal parts, thereby forming three blocks. Each of the blocks is formed by two frames each having a sync block SA or SB at the front. Each of the frames has a frame sync of 14 channel bits, and its information bits are 112 data bits. The 4-1 modulation converts data of 112 bits into 392 channel bits, and therefore the number of channel bits of a single frame is 406 (hence, n=3, m=2, and k=406). Disk ID information of 224 bits, that is, 28 bytes can be recorded in a single block.

Figure 13:
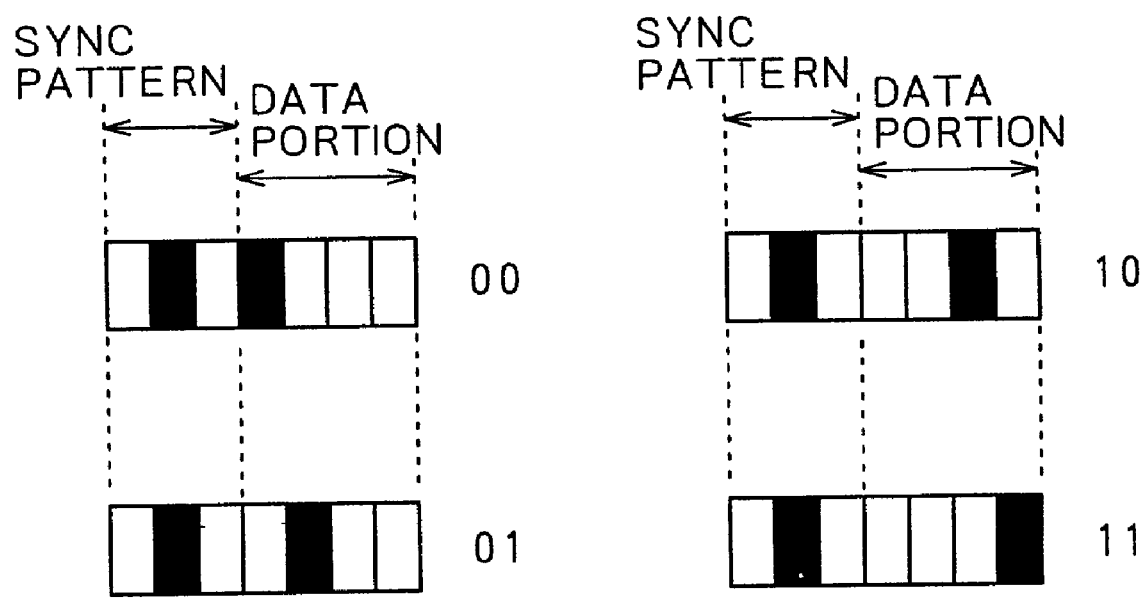
FIG. 13 is a diagram of assistance in explaining 4-1 modulation.

As shown in FIG. 13, the 4-1 modulation is a modulation method that modulates two data bits into seven channel bits. First three channel bits form a sync pattern denoted by "010", and succeeding four channel bits form a data portion, which indicates data by a position of "1" within the four channel bits. When two data bits before the modulation are "00", the data portion is "1000"; when two data bits before the modulation are "01", the data portion is "0100"; when two data bits before the modulation are "10", the data portion is "0010"; when two data bits before the modulation are "11", the data portion is "0001". One word is formed by the combined seven channel bits of the sync pattern and the data portion.

In the PE modulation method used in the first embodiment, equal numbers of logical "0s" and logical "1s" appear. Accordingly, in that case, substantially half of the reflecting film in the BCA 26A is removed. On the other hand, in the 4-1 modulation, a ratio of logical "0s" to logical "1s" is 5:2. Accordingly, the amount of reflected light is larger than when disk ID information is recorded by the PE modulation. Thus, the 4-1 modulation has an advantage of making it easier to effect servo control such as focus control during the reading of data, for example.

Also in this example, the ECC format of the disk ID information is the same as described with reference to FIG. 5. The disk ID information is encoded by an RS (32, 16, 13) code of GF ($2^8$), and 12-byte parity is added to form one block. The same block is written triply around the disk.

Figure 14A:
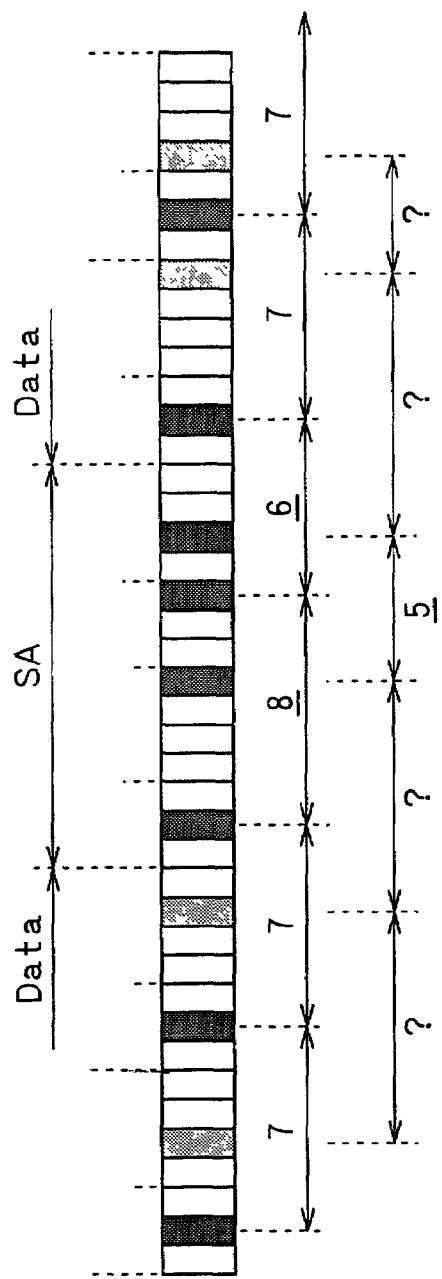
FIGS. 14A and 14B are diagrams of assistance in explaining sync patterns of frame sync in FIG. 12.
Figure 14B:
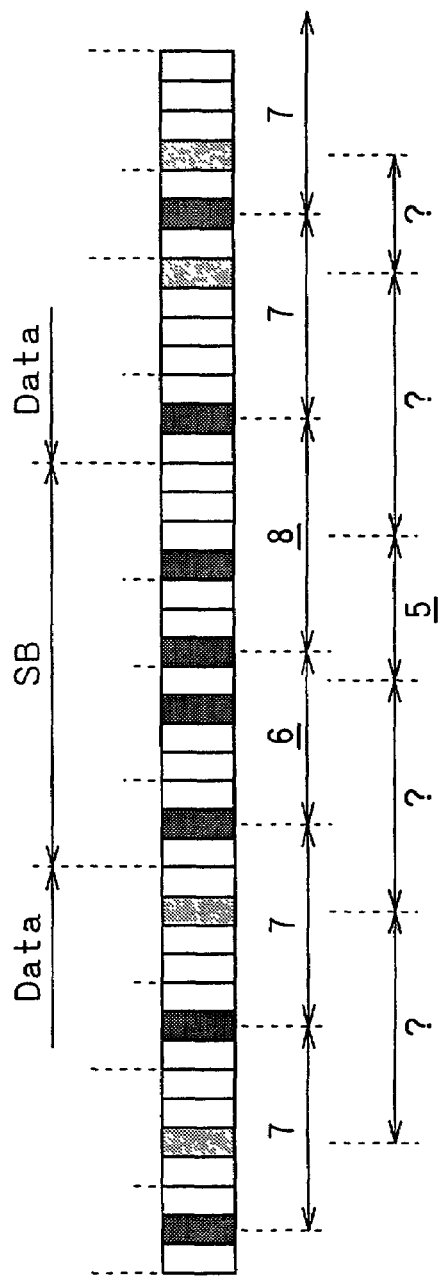

FIGS. 14A and 14B each show a sync pattern of a frame sync in the second embodiment.

In the 4-1 modulation, the position of a logical "1" is fixed in a sync pattern of three channel bits. Therefore, when attention is directed to the logical "1s" of sync patterns occurring after every other logical "1", the logical "1s" of sync patterns invariably have an interval of "7".

Thus, a sync pattern can be formed by breaking the regularity of the interval at which every other logical "1" occurs. A sync pattern "01000010010100" where the intervals at which every other logical "1" occurs are "8, 5, and 6" as shown in FIG. 14A is set as a first sync pattern SA. A sync pattern "01000101001000" where the intervals at which every other logical "1" occurs are "6, 5, and 8" as shown in FIG. 14B is set as a second sync pattern SB. Thus, in the second embodiment, a frame sync of 14 channel bits is inserted into the disk ID recording format.

Figure 15:
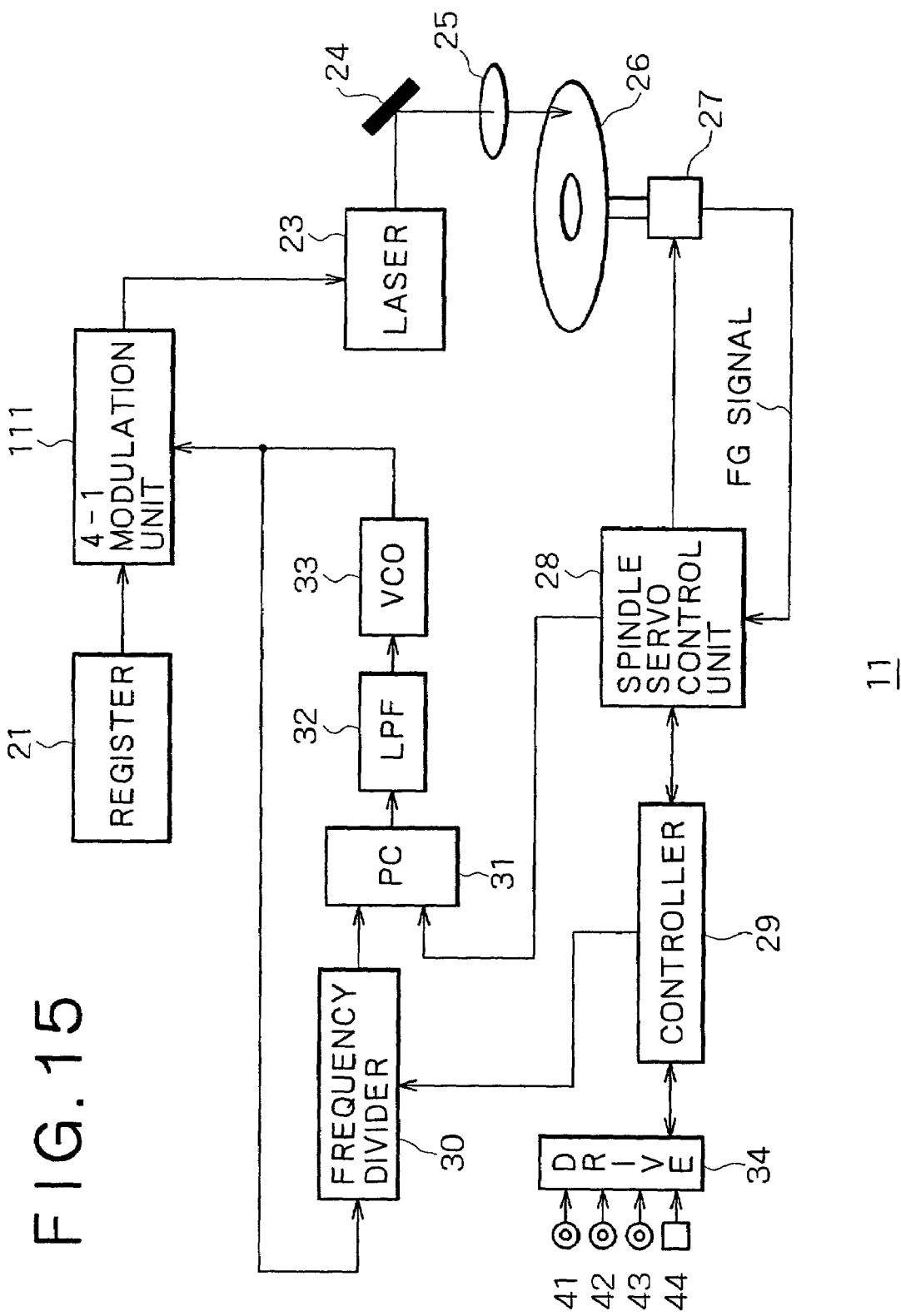
FIG. 15 is a block diagram showing a configuration of a disk ID recording apparatus for recording disk ID in the format of FIG. 12.

FIG. 15 is a block diagram showing a configuration of a disk ID recording apparatus 11 for recording the disk ID according to the second embodiment. Parts corresponding to those of the disk ID recording apparatus 11 described with reference to FIG. 8 are identified by the same reference numerals, and their description will be omitted where appropriate (the same will apply hereinafter). Specifically, the disk ID recording apparatus 11 of FIG. 15 has the same configuration as that of the disk ID recording apparatus 11 of FIG. 8 except that the disk ID recording apparatus 11 of FIG. 15 is provided with a 4-1 modulation unit 111 in place of the PE modulation unit 22 in FIG. 8. Therefore, operation of the disk ID recording apparatus 11 of FIG. 15 is the same as that of the disk ID recording apparatus 11 of FIG. 8 except the modulation method.

When the disk ID recording apparatus 11 of FIG. 15 records the disk ID recording format as described with reference to FIG. 12 on the circle of the BCA 26A of an optical disk 26, a PLL may be operated such that one rotation of the optical disk 26 is in synchronism with n×m×k of FIG. 12. For example, when the wave number of an FG signal outputted from a spindle motor 27 is 42 and then a frequency dividing coefficient N of a frequency divider 30 is set at 58, the cycle of a channel clock outputted from a VCO 33 becomes equal to 1/(3×2×406) of one rotation of the optical disk 26.

The configuration of a disk recording and playback apparatus 51 for recording data and reproducing data recorded in a data area 26B of the optical disk 26 having the disk ID information recorded by the disk ID recording apparatus 11 by the 4-1 modulation method is basically the same as shown in FIG. 9. However, processing of a demodulation unit 68 of the disk recording and playback apparatus 51 is different from that of the demodulation unit 68 shown in FIG. 9.

Channel position correction made by the demodulation unit 68 will be described with reference to FIGS. 16A through 16G. Also in this case, as in the first embodiment, description will be made assuming that p=3.

Figure 16:
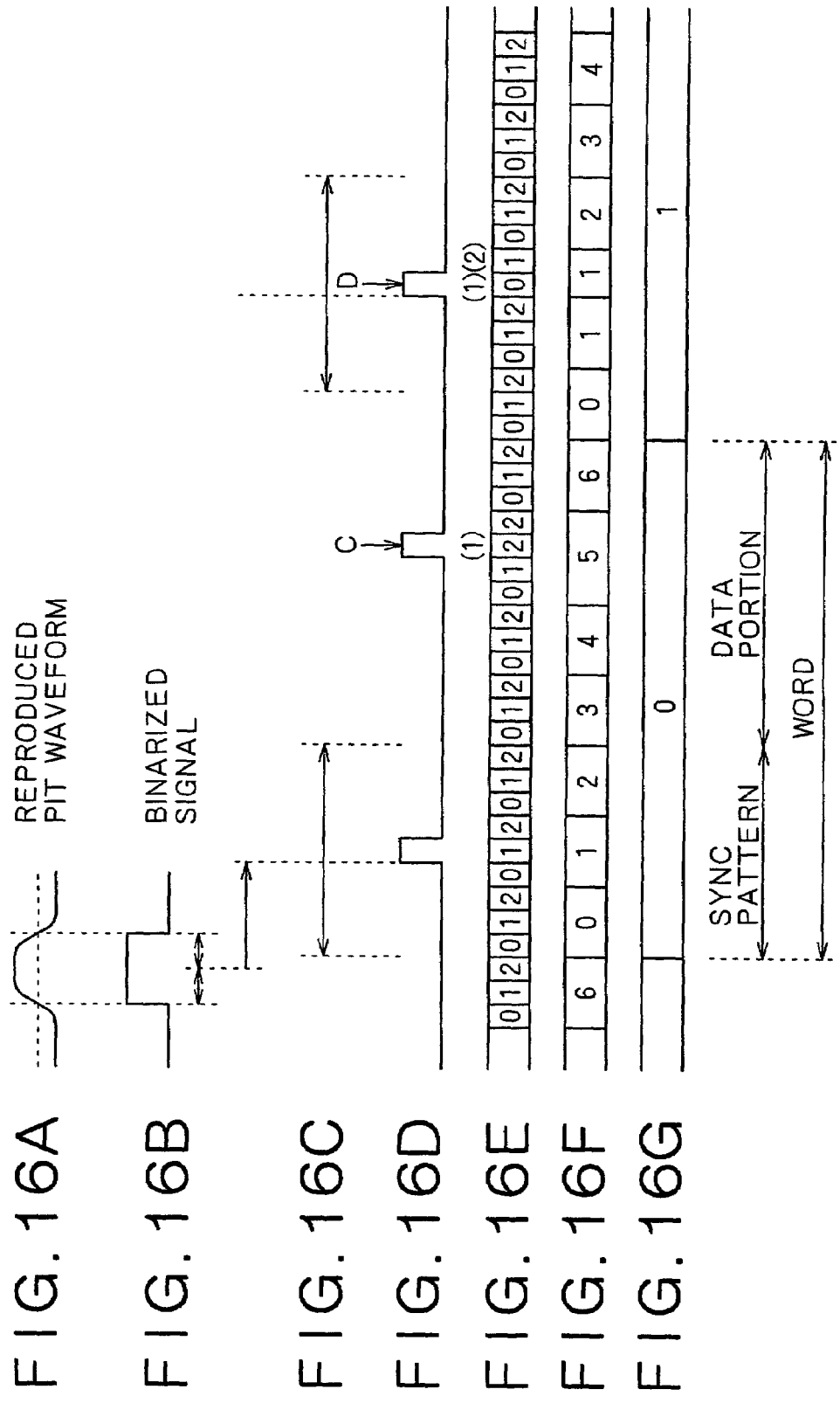
FIGS. 16A through 16G are diagrams of assistance in explaining operation of playing back an optical disk recorded in the format of FIG. 12.

A reproduced pit waveform (FIG. 16A) outputted from an LPF 66 is binarized by a comparator 67, and then inputted to the demodulation unit 68 as a binarized pit signal (FIG. 16B). The demodulation unit 68 delays the binarized pit signal inputted thereto by a certain time and generates a pit center signal (FIG. 16D) that rises precisely at a center of a period in which the binarized pit signal is a logical "1". The demodulation unit 68 includes a window generator for generating a window for counters 1 to 3 and sync pattern detection (that is, a window for reading a binarized signal of a reproduced pit when the value of the counter 2 is "0" to "2") (FIG. 16C). The counter 1 (FIG. 16E) counts the number of clocks (0 to p-1) within a channel bit. The counter 2 (FIG. 16F) counts the seven channel bits of the 4-1 modulation. The counter 3 (FIG. 16G) counts the number of words of the 4-1 modulation.

The channel position correction is made so that the value of the counter 1 becomes "1" when a pit center (FIG. 16D)

is detected. For example, the value of the counter 1 is corrected to be "1" in timing C in FIG. 16D in which a pit center is detected. In addition, word position correction is made so that a pit center (FIG. 16D) of a sync pattern is located at the center of a window (FIG. 16C). For example, the values of the counter 1 and the counter 2 are corrected to be "1" in timing D.

A plurality of frame syncs are arranged at equal intervals for one rotation of the optical disk 26. Therefore, even when a frame sync of a frame is not detected, it is possible to reproduce data succeeding the frame sync without loss of the data on the basis of interpolating timing of a frame sync previously detected.

Figure 17:
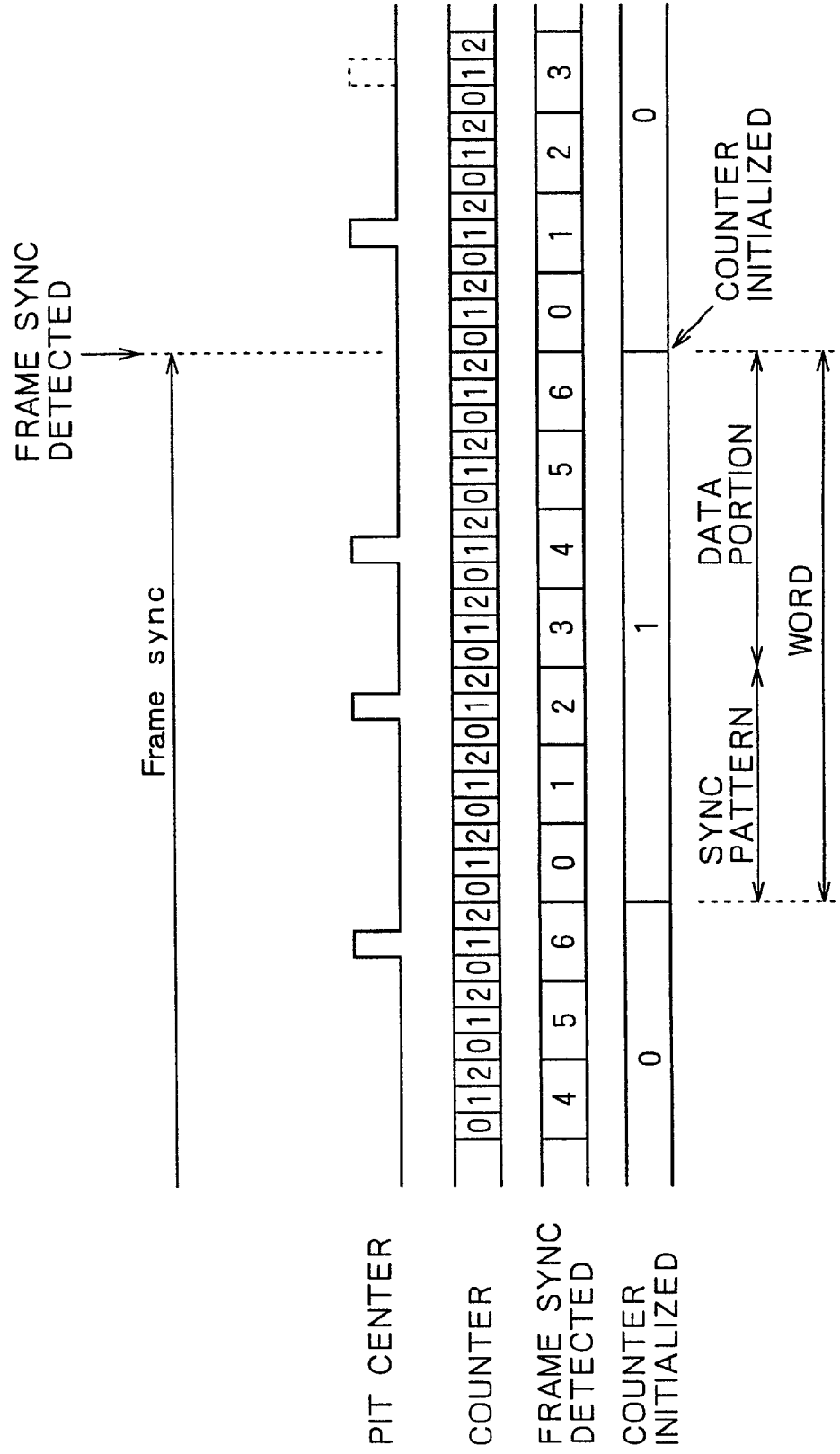
FIG. 17 is a diagram of assistance in explaining the operation of playing back the optical disk recorded in the format of FIG. 12.

As shown in FIG. 17, when a frame sync ("01000010010100" or "01000101001000") described with reference to FIGS. 14A and 14B is detected, the values of the counters 1 to 3 are initialized to "0".

Figure 18:
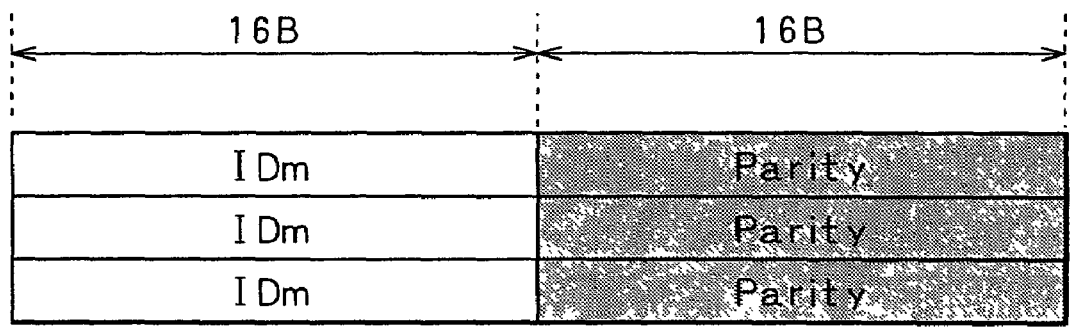
FIG. 18 is a diagram showing another ECC format.

Description will next be made of a case, as a third embodiment, in which the ECC format of disk ID information recorded in the register 21 is encoded by an RS (32, 16, 17) code of GF ($2^8$) as shown in FIG. 18, 16-byte parity is added to form one block, and the same block is subjected to 4-1 modulation and then written triply around the disk.

Figure 19A:
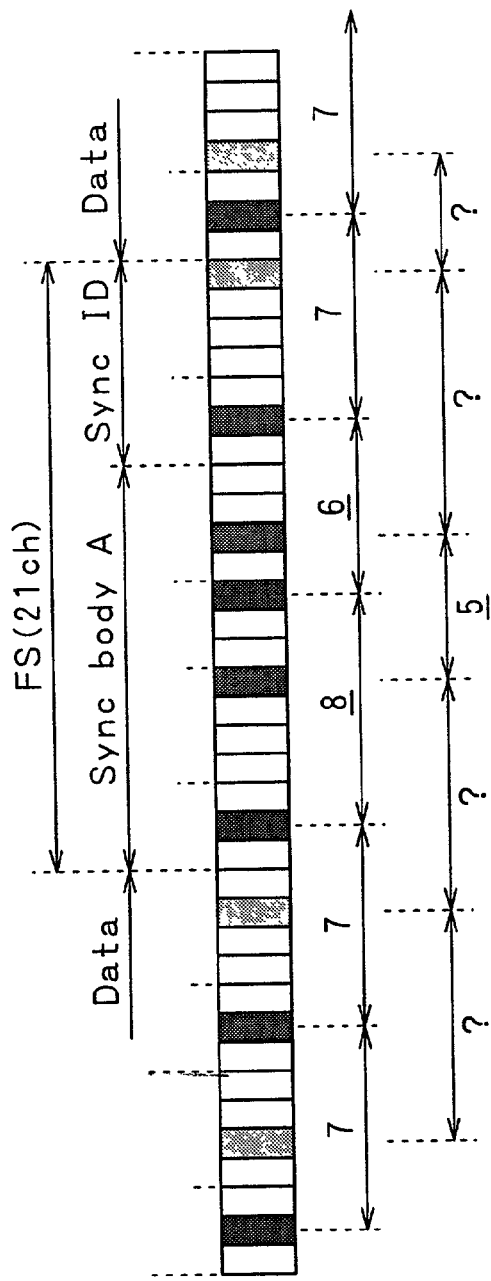
FIGS. 19A and 19B are diagrams showing other sync patterns of frame sync.
Figure 19B:
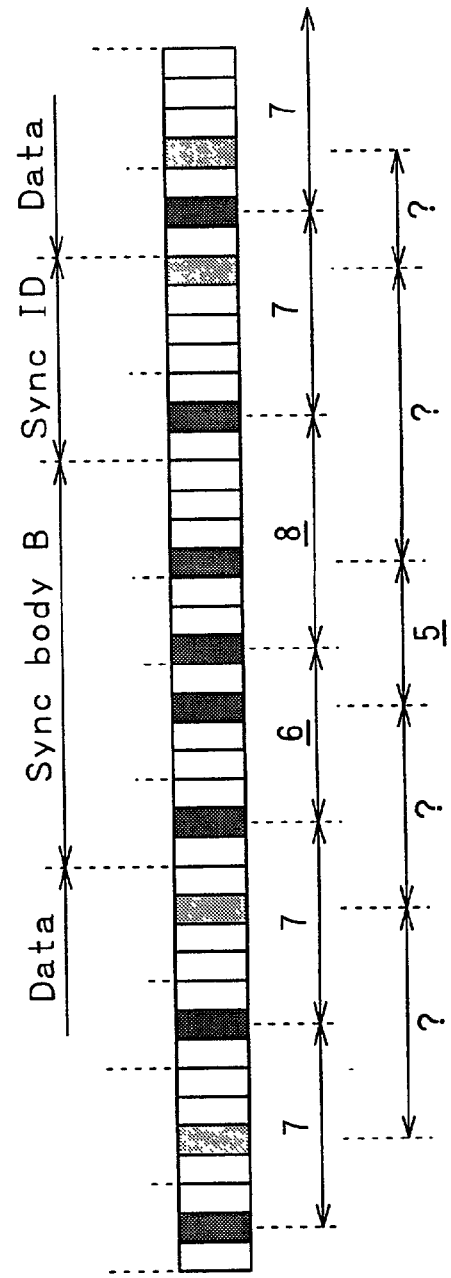

In this case, as shown in FIGS. 19A and 19B, a sync pattern of a frame sync is formed by adding one word as sync ID to each of the sync patterns SA and SB described with reference to FIGS. 14A and 14B. A sync pattern of a frame sync thus has a total of 21 channel bits. Hence, the sync ID makes it possible to represent four kinds of sync patterns by using each of the sync patterns SA and SB and thus form a total of eight sync patterns.

Figure 20:
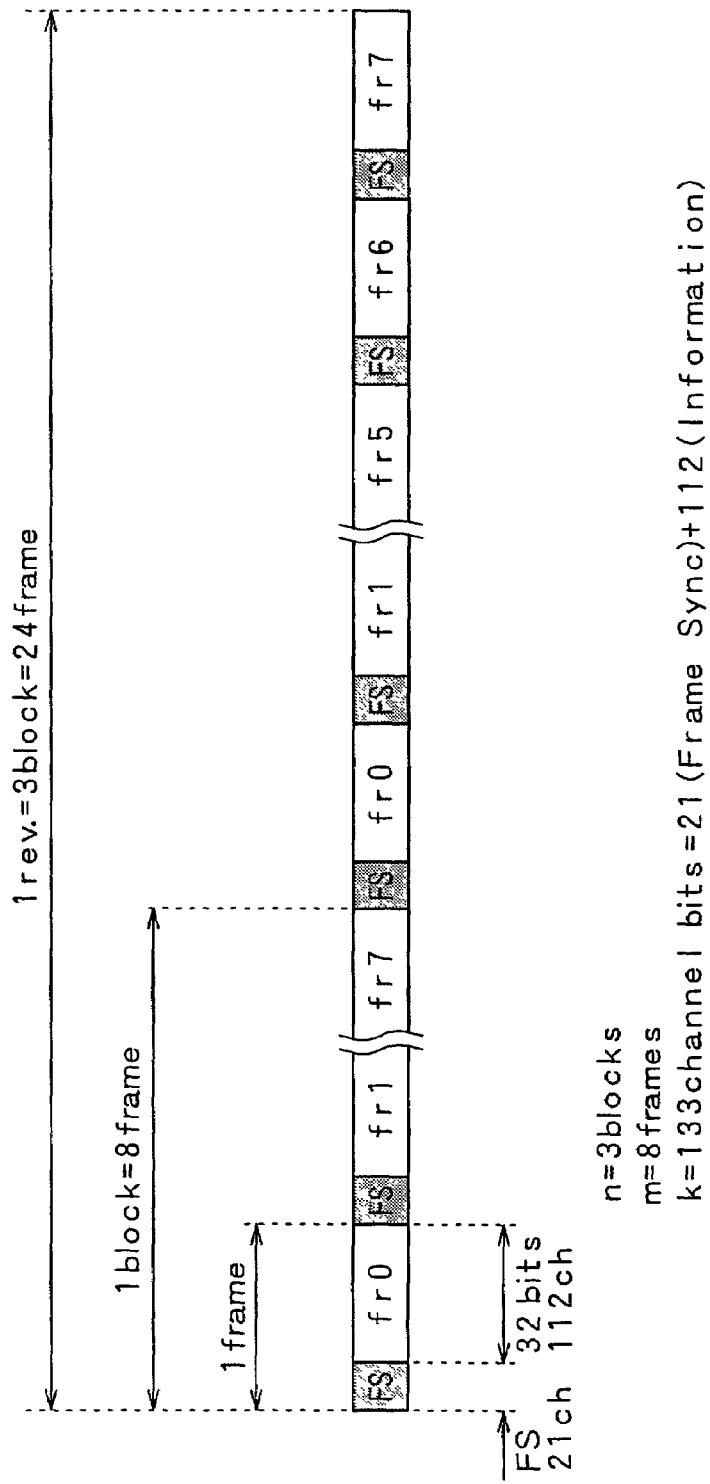
FIG. 20 is a diagram showing another disk ID recording format.

Accordingly, as shown in FIG. 20, it is possible to divide one block into eight frames.

In this case, n=3 and m=8. Data of 32 bits is disposed in one frame. The data is converted into 112 channel bits by 4-1 modulation, and therefore the value of k is 133 channel bits (=21+112).

The optical disk 26 is for example a CD (Compact Disk), an MD (Mini-Disk), a DVD (Digital Versatile Disk) or the like.

The series of processing steps described above may also be carried out by software. The software is installed from a recording medium onto a computer where programs forming the software are incorporated in dedicated hardware, or a general-purpose personal computer, for example, which can perform various functions by installing various programs thereon.

Examples of the recording medium include program-recorded package media distributed to users to provide a program separately from computers, such as the magnetic disks 41 and 91 (including floppy disks), the optical disks 42 and 92 (including CD-ROM (Compact Disk-Read Only Memory) and DVD (Digital Versatile Disk)), the magneto-optical disks 43 and 93 (including MD (Mini-Disk)), or the semiconductor memories 44 and 94, as shown in FIG. 8, FIG. 9, or FIG. 15.

As described above, the disk-like recording medium according to the present invention comprises: n blocks arranged by dividing a circle of a second area into n equal parts; and m frames arranged by dividing each of the blocks into m equal parts; wherein auxiliary information is arranged in the frames in such a manner as to be at equal intervals in a circumferential direction, and a synchronization signal is disposed in each of the frames. Therefore, it is possible to realize a disk allowing the auxiliary information to be read easily and reliably without using a PLL.

The disk recording apparatus and the disk recording method according to the present invention form n blocks by dividing a second area of a disk into n equal parts in a circumferential direction, form m frames by dividing each of the blocks into m equal parts in the circumferential direction, generate channel clocks by dividing each of the frames into k equal parts, control rotation of the disk so that one rotation of the disk is in synchronism with a cycle of n×m×k channel clocks, modulate auxiliary information on the basis of the channel clocks, and then record the auxiliary information on the disk. Therefore, it is possible to realize a disk allowing the auxiliary information to be reproduced easily and reliably without using a PLL.

The disk playback apparatus and the disk playback method according to the present invention sample a reproduced signal from a disk by a clock having a frequency twice n×m×k or higher, and demodulate channel bits, or words while correcting the channel bits, or the words. Therefore, it is possible to reproduce auxiliary information easily and reliably without using a PLL.

In each of the above cases, when a plurality of blocks are provided and auxiliary information is written multiply, it is possible to equivalently form a product code and thus realize a high correction capability.

Since the circle of the disk is in a substantially physically uniform state, it is possible to reduce effects on a focus servo and the like and to control deterioration of the disk.

Even if a defect is caused on the disk, it is possible to correct channel bits, or words. It is therefore possible to achieve high reliability in reproducing auxiliary information. Also, the redundancy of a synchronization signal may be at a low level.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A disk-like recording medium for concentrically recording auxiliary information of a disk in a second area other than a first area for recording contents data of said disk by a predetermined code, the recording medium comprising:
   n blocks, each block of said n blocks obtained by dividing said second area into n equal parts in a circumferential direction; and
   m frames, each frame of said m frames obtained by dividing said each block into m equal parts in the circumferential direction, wherein said auxiliary information is arranged in said frames in such a maimer as to be at equal intervals in the circumferential direction, and
   wherein said each frame includes a synchronization signal whose pattern is formed by arranging marks or spaces in three or more contiguous channel bits, such that said synchronization signal provides synchronism necessary for a playback apparatus to read said auxiliary information recorded in said second area, and
   wherein said auxiliary information is modulated by a 4-1 modulation method that modulates two data bits into seven channel bits.

2. A disk-like recording medium as claimed in claim 1 wherein in one of said frames, k channel bits are arranged at intervals obtained by dividing said frame into k equal parts.

3. A disk-like recording medium as claimed in claim 1 wherein, when a value of said m is two or more, the number of kinds of said synchronization signals is two or more and m or less.

4. A disk-like recording medium as claimed in claim 1 wherein an error correction code is added to said auxiliary information.

5. A disk recording apparatus for recording auxiliary information of a disk concentrically over a plurality of tracks in a second area other than a first area for recording contents data of said disk by a predetermined code comprising:
   rotating means for rotating said disk;
   generating means for generating a channel clock corresponding to an interval obtained by dividing one frame into k equal parts, where n blocks, each block having a length obtained by dividing said second area into n equal parts in a circumferential direction, are generated, and m frames, each frame having a length obtained by dividing said each block into m equal parts in the circumferential direction, are generated,
   wherein said channel clock is derived from a synchronization signal whose pattern is formed by arranging marks or spaces in three or more contiguous channel bits, such that said channel clock is required for recording said auxiliary information in said second area;
   control means for controlling rotation of said disk so that one rotation of said disk is in synchronism with a cycle of n×m×k channel clocks;
   modulating means for modulating said auxiliary information on the basis of said channel clock generated by said generating means,
   wherein said auxiliary information is modulated by a 4-1 modulation method that modulates two data bits into seven channel bits; and
   recording means for recording said auxiliary information modulated by said modulating means on said disk.

6. A disk recording method for a disk recording apparatus for recording auxiliary information of a disk concentrically over a plurality of tracks in a second area other than a first area for recording contents data of said disk by a predetermined code comprising:
   a rotating step for rotating said disk;
   a generating step for generating a channel clock corresponding to an interval obtained by dividing one frame into k equal parts, where n blocks, each block having a length obtained by dividing said second area into n equal parts in a circumferential direction, are generated, and m frames, each frame having a length obtained by dividing one of the blocks into m equal parts in the circumferential direction are generated,
   wherein said channel clock is derived from a synchronization signal whose pattern is formed by arranging marks or spaces in three or more contiguous channel bits, such that said channel clock is required for recording said auxiliary information in said second area;
   a control step for controlling rotation of said disk so that one rotation of said disk is in synchronism with a cycle of n×m×k channel clocks;
   a modulating step for modulating said auxiliary information on the basis of said channel clock generated by processing of said generating steps,
   wherein said auxiliary information is modulated by a 4-1 modulation method that modulates two data bits into seven channel bits; and
   a recording step for recording said auxiliary information modulated by processing of said modulating step on said disk.

7. A disk playback apparatus for playing back a disk on which auxiliary information of said disk is recorded by a predetermined code concentrically over a plurality of tracks in a second area other than a first area, in which contents data is recorded, on the basis of channel bits having intervals obtained by dividing one frame into k equal parts, where n blocks, each block having a length obtained by dividing said second area into n equal parts in a circumferential direction, are generated, and m frames, each frame having a length obtained by dividing one of the blocks into m equal parts in the circumferential direction, are generated, said disk playback apparatus comprising:
   rotating means for rotating said disk at a constant angular velocity;
   playback means for playing back said disk;
   generating means for generating a clock having a frequency twice n×m×k or higher,
   wherein said clock is derived from a synchronization signal whose pattern is formed by arranging marks or spaces in three or more contiguous channel bits, such that said clock is required for recording said auxiliary information in said second area, and
   wherein said auxiliary information is modulated by a 4-1 modulation method that modulates two data bits into seven channel bits; and
   demodulating means for sampling a signal outputted by said playback means on the basis of said clock generated by said generating means and demodulating said channel bits, or words while correcting said channel bits, or the words.

8. A disk playback apparatus as claimed in claim 7, further comprising correcting means for making error correction on the basis of an error correction code included in said auxiliary information and determining correct auxiliary information by majority rule.

9. A disk playback apparatus as claimed in claim 8 wherein said correcting means makes error correction on auxiliary information obtained by collecting portions determined by majority rule.

10. A disk playback method for a disk playback apparatus for playing back a disk on which auxiliary information of said disk is recorded by a predetermined code concentrically over a plurality of tracks in a second area other than a first area, in which contents data is recorded, on the basis of channel bits having intervals obtained by dividing one frame into k equal parts, where n blocks, each block having a length obtained by dividing said second area into n equal parts in a circumferential direction, are generated, and m frames, each frame having a length obtained by dividing one of the blocks into m equal parts in the circumferential direction, are generated, the disk playback method comprising:
   a rotating step for rotating said disk at a constant angular velocity;
   a playback step for playing back said disk;
   a generating step for generating a clock having a frequency twice n×m×k or higher,
   wherein said clock is derived from a synchronization signal whose pattern is formed by arranging marks or spaces in three or more contiguous channel bits, such that said clock is required for recording said auxiliary information in said second area, and
   wherein said auxiliary information is modulated by a 4-1 modulation method that modulates two data bits into seven channel bits; and
   a demodulating step for sampling a signal outputted by processing of said playback step on the basis of said clock generated by processing of said generating step and demodulating said channel bits, or words while correcting said channel bits, or the words.

* * * * *

UNITED STATES PATENT AND TRADEMARK OFFICE
CERTIFICATE OF CORRECTION

| | |
|---|---|
| PATENT NO. | : 6,996,048 B2 |
| APPLICATION NO. | : 09/957496 |
| DATED | : February 7, 2006 |
| INVENTOR(S) | : Susumu Senshu |

It is certified that error appears in the above-identified patent and that said Letters Patent is hereby corrected as shown below:

Column 15, line 57, please change "generating steps" to --generating step--.

Signed and Sealed this

Seventeenth Day of October, 2006

JON W. DUDAS
*Director of the United States Patent and Trademark Office*